United States Patent
Islam et al.

(10) Patent No.: US 10,425,200 B2
(45) Date of Patent: Sep. 24, 2019

(54) SYSTEM AND METHOD FOR BEAM ADJUSTMENT REQUEST

(71) Applicant: QUALCOMM Incorporated, San Diego, CA (US)

(72) Inventors: Muhammad Nazmul Islam, Edison, NJ (US); Tao Luo, San Diego, CA (US); Juergen Cezanne, Ocean Township, NJ (US); Sundar Subramanian, Bridgewater, NJ (US); Ashwin Sampath, Skillman, NJ (US); Bilal Sadiq, Basking Ridge, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/335,353

(22) Filed: Oct. 26, 2016

(65) Prior Publication Data

US 2017/0302414 A1  Oct. 19, 2017

Related U.S. Application Data

(60) Provisional application No. 62/341,051, filed on May 24, 2016, provisional application No. 62/338,484, (Continued)

(51) Int. Cl.
*H04W 24/00* (2009.01)
*H04L 5/00* (2006.01)
(Continued)

(52) U.S. Cl.
CPC ......... *H04L 5/0032* (2013.01); *H04B 7/0408* (2013.01); *H04B 7/0421* (2013.01);
(Continued)

(58) Field of Classification Search
None
See application file for complete search history.

(56) References Cited

U.S. PATENT DOCUMENTS 5,724,048 A    3/1998 Remondiere et al.
6,208,858 B1   3/2001 Antonio et al.
(Continued)

FOREIGN PATENT DOCUMENTS

AU    2014230299 A1   9/2015
EP    3122094 A1      1/2017
(Continued)

OTHER PUBLICATIONS

International Search Report and Written Opinion—PCT/US2017/025764—ISA/EPO—dated Jun. 19, 2017.

*Primary Examiner* — Suhail Khan
(74) *Attorney, Agent, or Firm* — Arent Fox, LLP; Clint R. Morin

(57) ABSTRACT

One apparatus may be configured to detect a set of beams from a base station. The apparatus may be further configured to select a beam of the set of beams. The apparatus may be further configured to determine at least one resource based on the selected beam. The apparatus may be further configured to transmit, on the at least one determined resource, a beam adjustment request to the base station. The request may indicate an index associated with the selected beam. Another apparatus may be configured to transmit a first set of beams. The other apparatus may be further configured to receive a beam adjustment request on at least one resource. The other apparatus may be further configured to determine a beam index of a beam in the first set of beams based on the request and the at least one resource.

24 Claims, 14 Drawing Sheets

Related U.S. Application Data filed on May 18, 2016, provisional application No. 62/337,829, filed on May 17, 2016, provisional application No. 62/333,120, filed on May 6, 2016, provisional application No. 62/329,180, filed on Apr. 28, 2016, provisional application No. 62/322,168, filed on Apr. 13, 2016.

(51) Int. Cl.
| | | |
|---|---|---|
| *H04W 72/08* | (2009.01) | |
| *H04B 7/0408* | (2017.01) | |
| *H04B 7/0417* | (2017.01) | |
| *H04B 7/06* | (2006.01) | |
| *H04B 7/08* | (2006.01) | |
| *H04W 72/04* | (2009.01) | |
| *H04W 74/00* | (2009.01) | |
| *H04W 88/08* | (2009.01) | |

(52) U.S. Cl.
CPC ........... *H04B 7/0695* (2013.01); *H04B 7/088* (2013.01); *H04L 5/005* (2013.01); *H04L 5/0048* (2013.01); *H04W 72/046* (2013.01); *H04W 72/085* (2013.01); *H04W 74/002* (2013.01); *H04L 5/0023* (2013.01); *H04W 88/08* (2013.01)

(56) References Cited

U.S. PATENT DOCUMENTS

| | | |
|---|---|---|
| 7,310,537 B2 | 12/2007 | Wichman et al. |
| 2010/0296472 A1 | 11/2010 | Lee et al. |
| 2011/0107169 A1 | 5/2011 | Loehr et al. |
| 2011/0149842 A1 | 6/2011 | Cordeiro et al. |
| 2011/0211490 A1 | 9/2011 | Nikula et al. |
| 2013/0064239 A1 | 3/2013 | Yu et al. |
| 2013/0083774 A1 | 4/2013 | Son et al. |
| 2013/0155847 A1 | 6/2013 | Li et al. |
| 2013/0182683 A1 | 7/2013 | Seol et al. |
| 2013/0235742 A1 | 9/2013 | Josiam et al. |
| 2013/0301619 A1 | 11/2013 | Singh et al. |
| 2014/0044044 A1 | 2/2014 | Josiam et al. |
| 2014/0146697 A1 | 5/2014 | Kim et al. |
| 2014/0177607 A1 | 6/2014 | Li et al. |
| 2014/0192917 A1 | 7/2014 | Nam et al. |
| 2014/0198696 A1 | 7/2014 | Li et al. |
| 2014/0211731 A1 | 7/2014 | Inoue et al. |
| 2014/0369245 A1 | 12/2014 | Pecen et al. |
| 2014/0376466 A1 | 12/2014 | Jeong et al. |
| 2015/0009951 A1 | 1/2015 | Josiam et al. |
| 2015/0045048 A1 | 2/2015 | Xu et al. |
| 2015/0049663 A1 | 2/2015 | Mukherjee et al. |
| 2015/0049824 A1 | 2/2015 | Kim et al. |
| 2015/0103784 A1 | 4/2015 | Lorca |
| 2015/0181546 A1 | 6/2015 | Freda et al. |
| 2015/0288439 A1 | 10/2015 | Kim et al. |
| 2015/0350992 A1 | 12/2015 | Han et al. |
| 2015/0359003 A1 | 12/2015 | Kim et al. |
| 2016/0095003 A1 | 3/2016 | Yu et al. |
| 2016/0099763 A1 | 4/2016 | Chen et al. |
| 2016/0105872 A1 | 4/2016 | Kuo |
| 2016/0119887 A1 | 4/2016 | Charipadi et al. |
| 2016/0134456 A1 | 5/2016 | Maltsev et al. |
| 2016/0157267 A1 | 6/2016 | Frenne et al. |
| 2016/0174258 A1 | 6/2016 | Wang et al. |
| 2016/0183242 A1 | 6/2016 | Cordeiro et al. |
| 2016/0190686 A1 | 6/2016 | Gao et al. |
| 2016/0192401 A1 | 6/2016 | Park et al. |
| 2016/0211902 A1 | 7/2016 | Park et al. |
| 2016/0353510 A1 | 12/2016 | Zhang et al. |
| 2016/0380685 A1 | 12/2016 | Kasher et al. |
| 2016/0380742 A1 | 12/2016 | Suzuki et al. |
| 2017/0012692 A1 | 1/2017 | Kim et al. |
| 2017/0111886 A1 | 4/2017 | Kim et al. |
| 2017/0207845 A1* | 7/2017 | Moon ................... H04B 7/088 |
| 2017/0272223 A1 | 9/2017 | Kim et al. |
| 2017/0288763 A1 | 10/2017 | Yoo et al. |
| 2017/0295502 A1 | 10/2017 | Stirling-Gallacher et al. |
| 2017/0295508 A1 | 10/2017 | Stirling-Gallacher et al. |
| 2017/0302355 A1 | 10/2017 | Islam et al. |
| 2017/0303264 A1 | 10/2017 | Islam et al. |
| 2017/0303265 A1 | 10/2017 | Islam et al. |
| 2017/0332300 A1 | 11/2017 | Choi et al. |
| 2018/0019790 A1 | 1/2018 | Mondal et al. |
| 2018/0049055 A1 | 2/2018 | Wiberg et al. |
| 2018/0138590 A1 | 5/2018 | Uchida et al. |
| 2018/0138962 A1 | 5/2018 | Islam et al. |
| 2018/0139791 A1 | 5/2018 | Bai et al. |
| 2018/0219605 A1 | 8/2018 | Davydov et al. |
| 2018/0220416 A1 | 8/2018 | Islam et al. |
| 2018/0249433 A1 | 8/2018 | Shin et al. |
| 2018/0287722 A1 | 10/2018 | Takano |
| 2018/0323852 A1 | 11/2018 | Islam et al. |
| 2019/0028980 A1 | 1/2019 | Feuersaenger et al. |
| 2019/0068266 A1 | 2/2019 | Chang et al. |
| 2019/0081676 A1 | 3/2019 | Wei et al. |

FOREIGN PATENT DOCUMENTS

| | | |
|---|---|---|
| WO | 2014117352 A1 | 8/2014 |
| WO | 2015032101 A1 | 3/2015 |
| WO | 2015060681 A1 | 4/2015 |
| WO | 2015141065 A1 | 9/2015 |
| WO | 2015147717 A1 | 10/2015 |
| WO | 2016018168 A1 | 2/2016 |
| WO | 2016086144 A1 | 6/2016 |
| WO | 2017173961 A1 | 10/2017 |

* cited by examiner

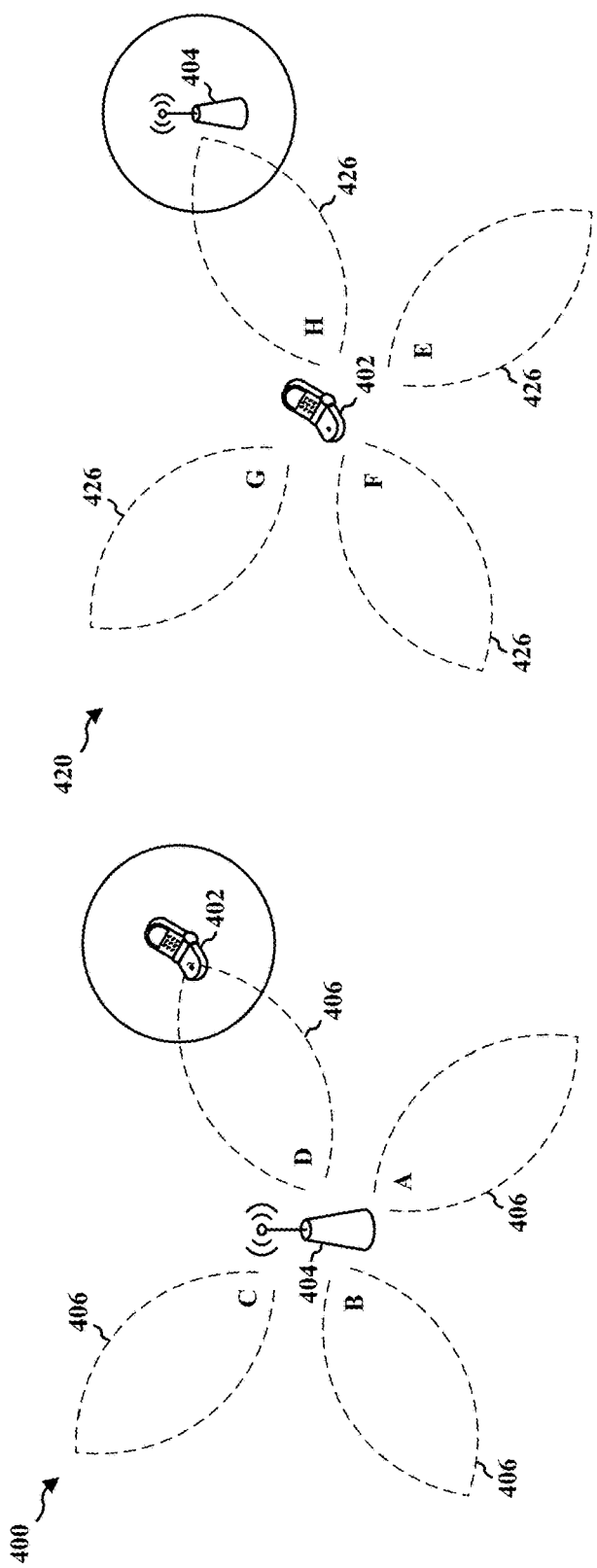

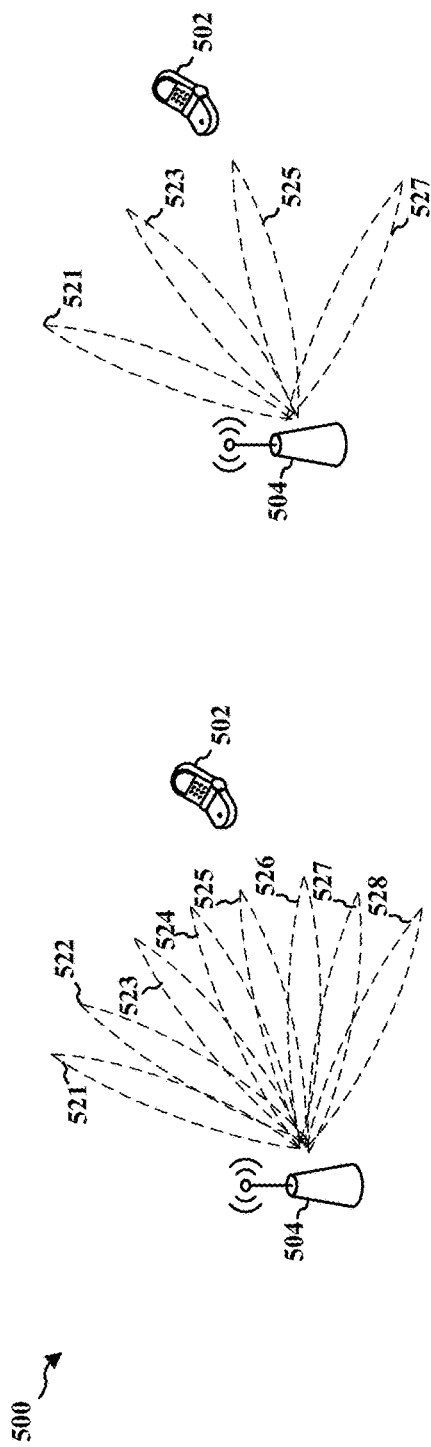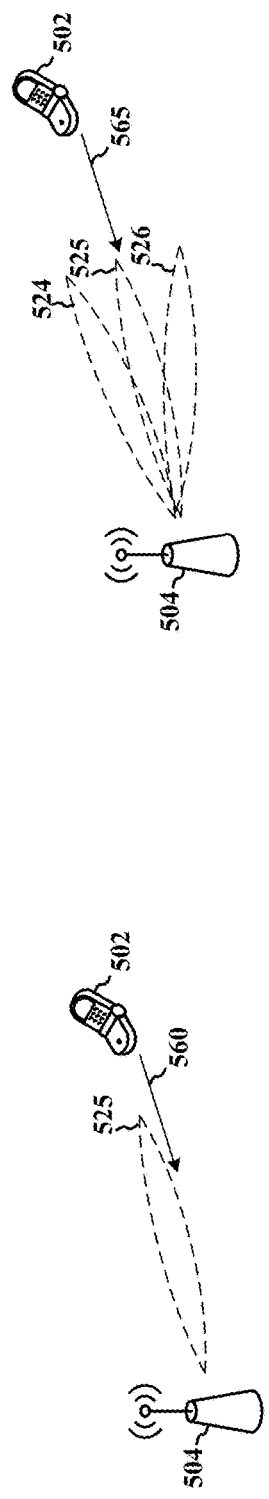
FIG. 5B
FIG. 5D
FIG. 5A
FIG. 5C

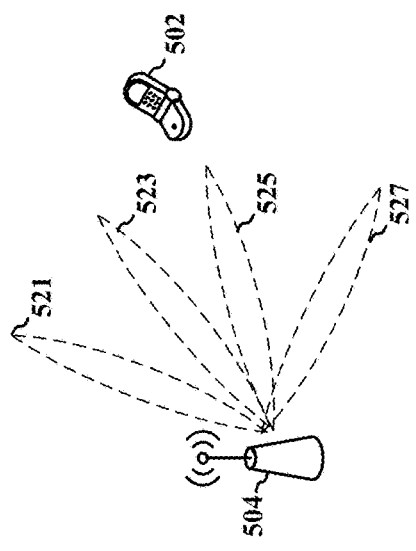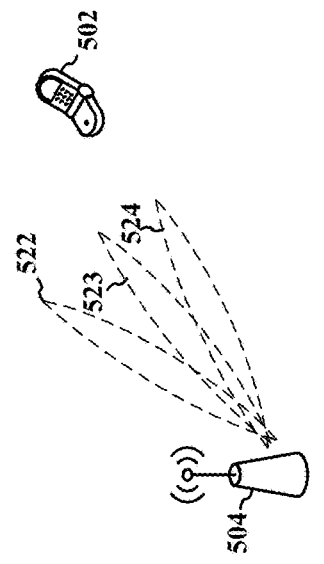
FIG. 5E
FIG. 5G
FIG. 5F

SYSTEM AND METHOD FOR BEAM ADJUSTMENT REQUEST

CROSS-REFERENCE TO RELATED APPLICATION(S)

This application claims the benefit of U.S. Provisional Application Ser. No. 62/322,168, entitled "TRANSMIT REQUEST FOR BEAM TRACKING" and filed on Apr. 13, 2016, U.S. Provisional Application Ser. No. 62/329,180, entitled "TRANSMIT REQUEST FOR BEAM TRACKING" and filed on Apr. 28, 2016, U.S. Provisional Application Ser. No. 62/333,120, entitled "TRANSMIT REQUEST FOR BEAM TRACKING" and filed on May 6, 2016, U.S. Provisional Application Ser. No. 62/337,829, entitled "TRANSMIT REQUEST FOR BEAM TRACKING" and filed on May 17, 2016, U.S. Provisional Application Ser. No. 62/338,484, entitled "TRANSMIT REQUEST FOR BEAM TRACKING" and filed on May 18, 2016, and U.S. Provisional Application Ser. No. 62/341,051, entitled "TRANSMIT REQUEST FOR BEAM TRACKING" and filed on May 24, 2016. The disclosures of the aforementioned provisional applications are expressly incorporated by reference herein in their entireties.

BACKGROUND

Field

The present disclosure relates generally to communication systems, and more particularly, to a user equipment that may inform a base station of a beam adjustment request.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Path loss may be relatively high in millimeter wave (mmW) systems. Transmission may be directional to mitigate path loss. A base station may transmit one or more beam reference signals by sweeping in all directions so that a user equipment (UE) may identify a best "coarse" beam. Further, the base station may transmit a beam refinement request signal so that the UE may track "fine" beams. If a "coarse" beam identified by the UE changes, the UE may need to inform the base station so that the base station may train one or more new "fine" beams for the UE.

In various aspects, the UE may send an index of a best beam and corresponding beam refinement reference signal session request to the base station in a subframe reserved for a random access channel (RACH). The UE may occupy one or more tones reserved for RACH. Further, the UE may occupy tones that are reserved for scheduling request but not for RACH transmission.

In an aspect of the disclosure, a method, a computer-readable medium, and an apparatus are provided. The apparatus may be configured to detect a set of beams from a base station. The apparatus may be further configured to select a beam of the set of beams. The apparatus may be further configured to determine at least one resource based on the selected beam. In an aspect, the at least one resource may be at least one of a radio frame index, a subframe index, a symbol index, or a subcarrier region. The apparatus may be further configured to transmit, on the at least one determined resource, a beam adjustment request, e.g., a request for beam tracking to the base station. In an aspect, the at least one determined resource may indicate an index associated with the selected beam.

In another aspect of the disclosure, another method, another computer-readable medium, and another apparatus are provided. The other apparatus may be configured to transmit a first set of beams. The other apparatus may be further configured to receive a beam adjustment request, e.g., a request for beam tracking on at least one resource. In an aspect, the at least one resource may be at least one of a radio frame index, a subframe index, a symbol index, or a subcarrier region. The other apparatus may be further configured to determine a beam index of a beam in the first set of beams based on the at least one resource.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 4A and 4B are diagrams of a wireless communications system.

FIGS. 5A through 5G illustrate diagrams of a wireless communications system.

DETAILED DESCRIPTION

Figure 1:
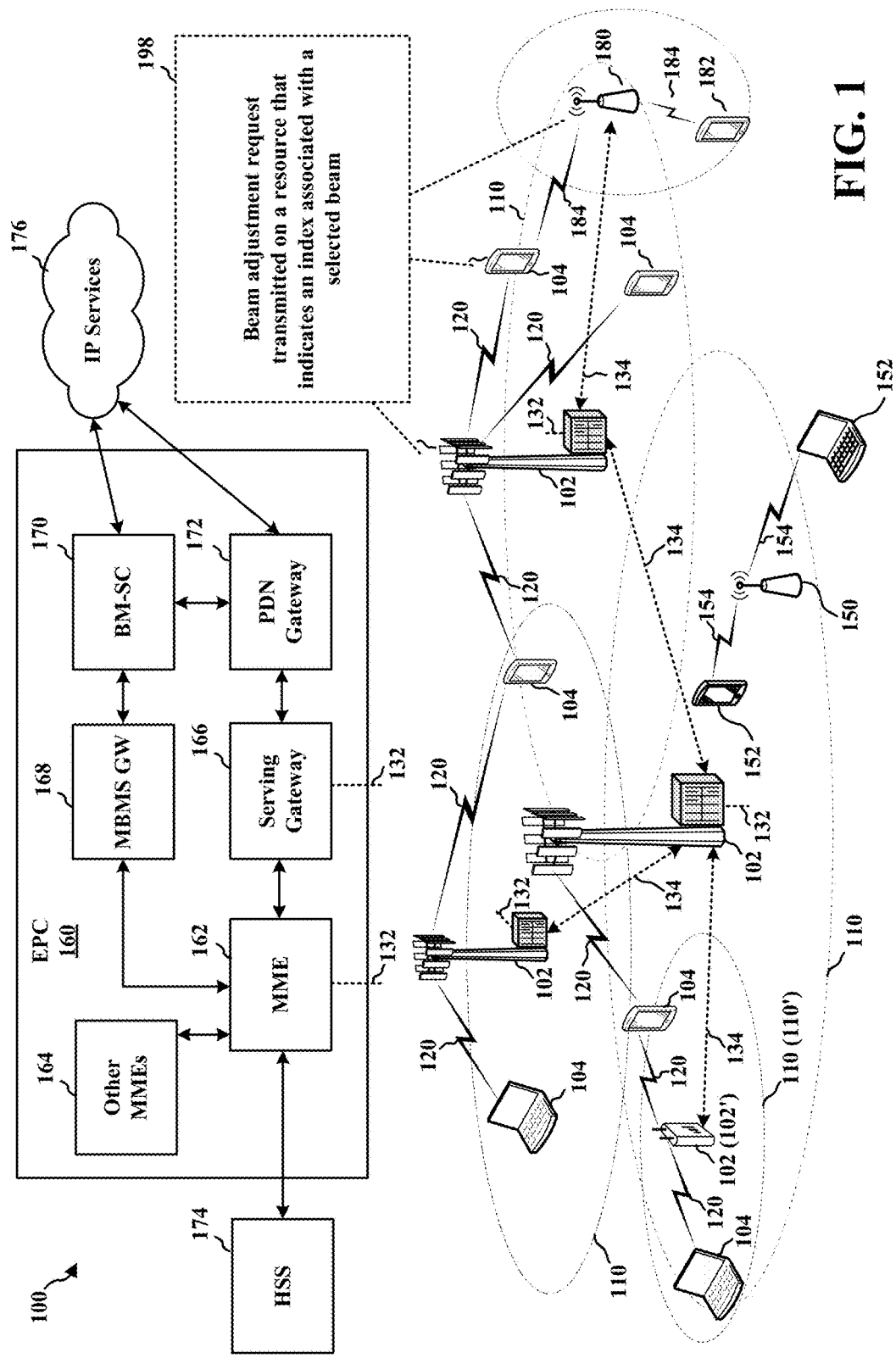
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. In one aspect, the UE 182 may be an aspect of the UE 104. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the mmW base station 180 and the base station 102 may be integrated into a single base station (although not necessarily). In an aspect, the mmW base station 180 may be configured to transmit a first set of beams to the UE 104. The first set of beams may be considered "coarse" beams.

The UE 104 may receive, from the mmW base station 180, the first set of beams. The UE 104 may be configured to select a beam of the set of beams. For example, the UE 104 may be configured to select a beam having a strongest received power. The selected beam may be associated with an index at the mmW base station 180, and the UE 104 may be configured to index this index to the mmW base station 180.

In an aspect, the UE 104 may indicate an index of a selected beam to the mmW base station 180 using at least one resource. Accordingly, the UE 104 may be configured to determine at least one resource based on the selected beam. For example, the at least one resource may include a radio frame index, a subframe index, a symbol index, or a subcarrier index. The UE 104 may transmit, on the at least one determined resource, a beam adjustment request 198 (e.g., a request for beam tracking, a request for the mmW base station 180 to start transmitting at an indicated beam ID without any further beam tracking, and the like). The at least one resource may indicate the index associated with the selected beam.

The mmW base station 180 may receive the request 198 on the at least one determined resource. The mmW base station 180 may be configured to determine a beam index of a beam in the first set of beams based on the at least one resource. For example, the request 198 may include a request to transmit a "fine" beam set based on the selected beam, for example, so that the UE 104 may perform beam refinement.

Figure 2:
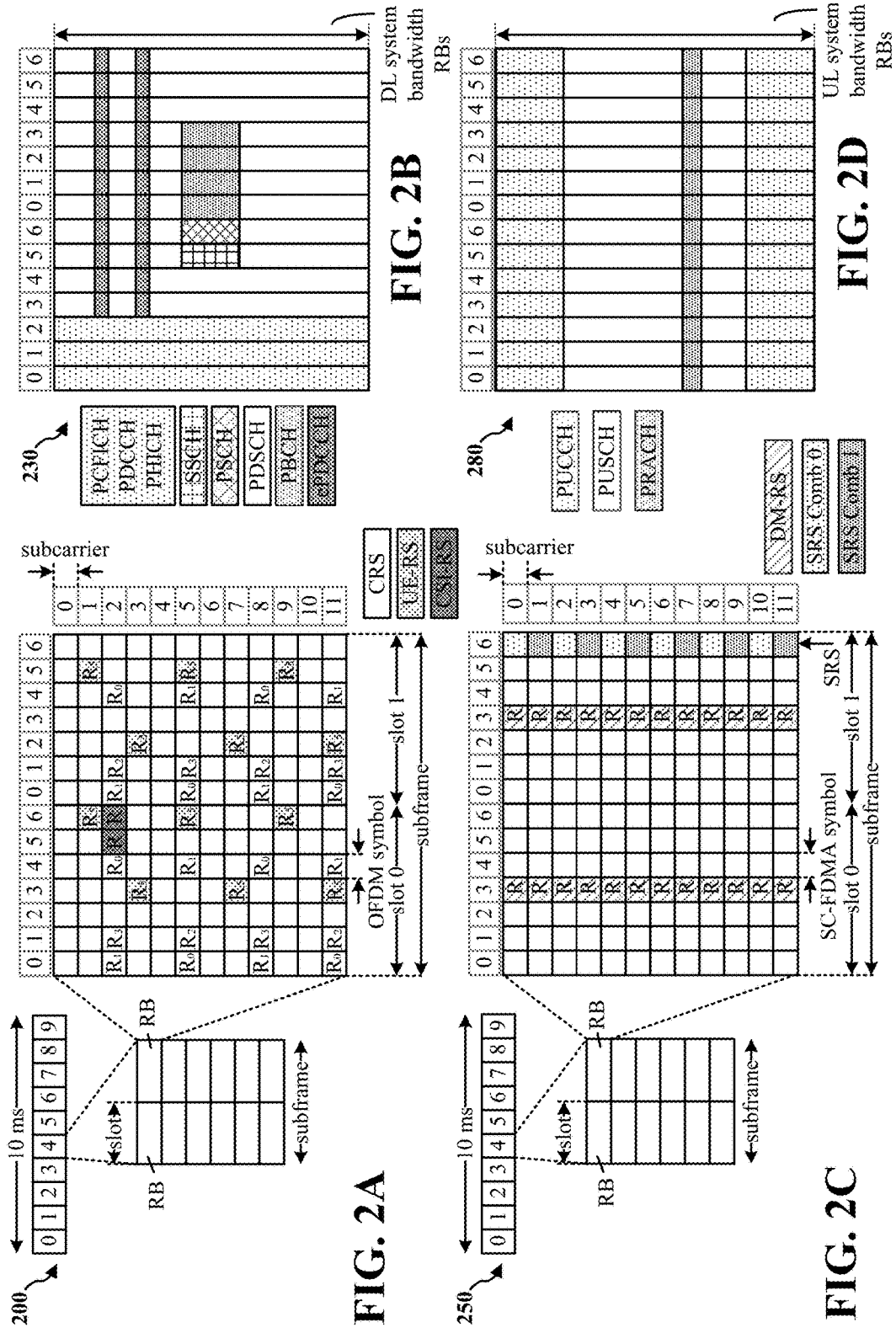
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
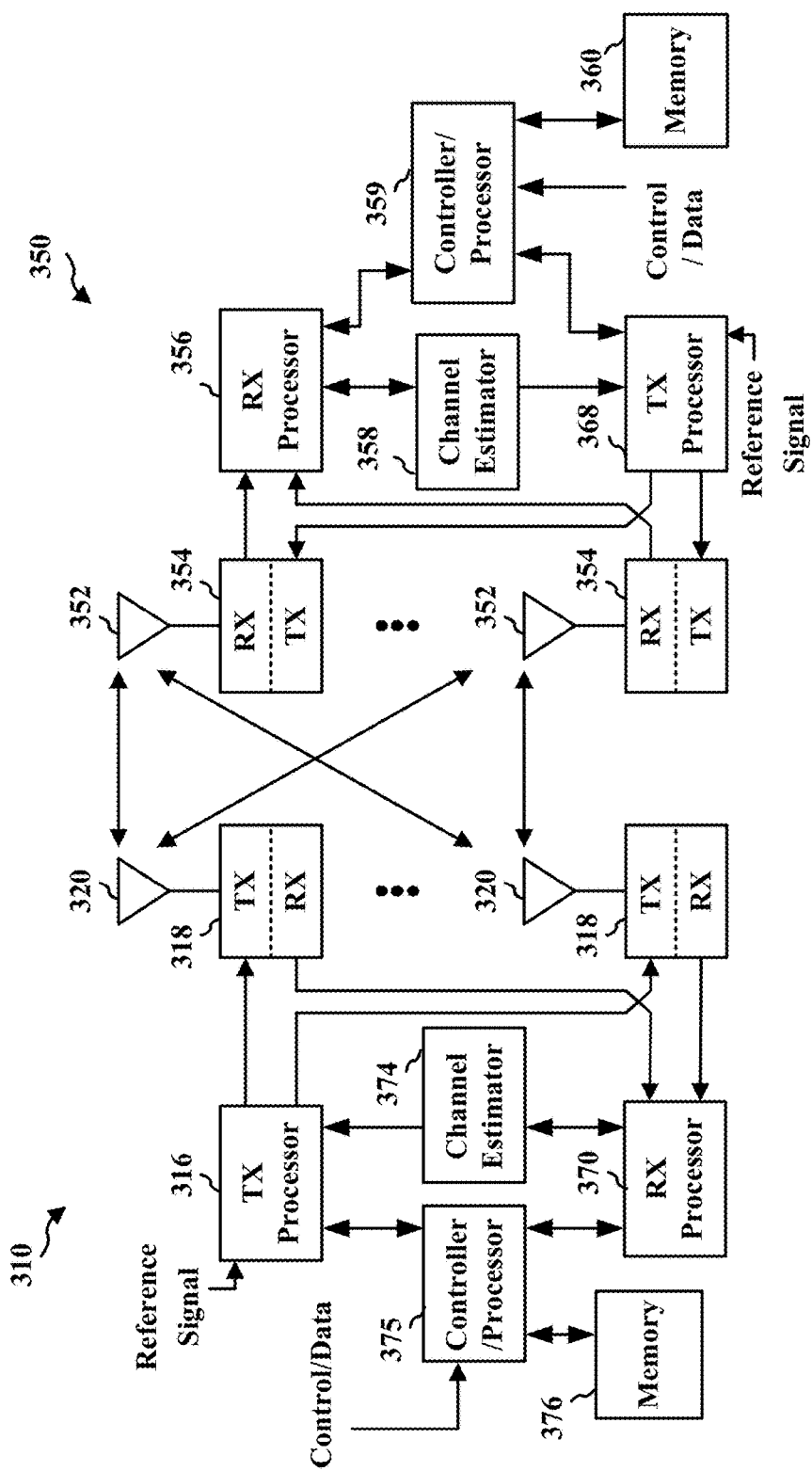
FIG. 3 is a diagram illustrating an example of a base station and user equipment (UE) in an access network.

FIG. 3 is a block diagram of an base station 310 in communication with a UE 350 in an access network. In an aspect, the base station 310 may be an aspect of the mmW base station 180 and/or the base station 102. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/ demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

FIGS. 4A and 4B are diagrams illustrating an example of the transmission of beamformed signals between a base station (BS) and a UE. The BS may be embodied as a BS in a mmW system (mmW BS). Referring to FIG. 4A, diagram 400 illustrates a BS 404 of a mmW system transmitting beamformed signals 406 (e.g., beam reference signals) in different transmit directions (e.g., directions A, B, C, and D). In an example, the BS 404 may sweep through the transmit directions according to a sequence A-B-C-D. In another example, the BS 404 may sweep through the transmit directions according to the sequence B-D-A-C. Although only four transmit directions and two transmit sequences are described with respect to FIG. 4A, any number of different transmit directions and transmit sequences are contemplated.

After transmitting the signals, the BS 404 may switch to a receive mode. In the receive mode, the BS 404 may sweep through different receive directions in a sequence or pattern corresponding (mapping) to a sequence or pattern in which the BS 404 previously transmitted the synchronization/discovery signals in the different transmit directions. For example, if the BS 404 previously transmitted the synchronization/discovery signals in transmit directions according to the sequence A-B-C-D, then the BS 404 may sweep through receive directions according to the sequence A-B-C-D in an attempt to receive an association signal from a UE 402. In another example, if the BS 404 previously transmitted the synchronization/discovery signals in transmit directions according to the sequence B-D-A-C, then the BS 404 may sweep through receive directions according to the sequence B-D-A-C in an attempt to receive the association signal from the UE 402.

A propagation delay on each beamformed signal allows a UE 402 to perform a receive (RX) sweep. The UE 402 in a receive mode may sweep through different receive directions in an attempt to detect a synchronization/discovery signal 406 (see FIG. 4B). One or more of the synchronization/discovery signals 406 may be detected by the UE 402. When a strong synchronization/discovery signal 406 is detected, the UE 402 may determine an optimal transmit direction of the BS 404 and an optimal receive direction of the UE 402 corresponding to the strong synchronization/discovery signal. For example, the UE 402 may determine preliminary antenna weights/directions of the strong synchronization/discovery signal 406, and may further determine a time and/or resource where the BS 404 is expected to optimally receive a beamformed signal. Thereafter, the UE 402 may attempt to associate with the BS 404 via a beamformed signal.

The BS 404 may sweep through a plurality of directions using a plurality of ports in a cell-specific manner in a first symbol of a synchronization subframe. For example, the BS 404 may sweep through different transmit directions (e.g., directions A, B, C, and D) using four ports in a cell-specific manner in a first symbol of a synchronization subframe. In an aspect, these different transmit directions (e.g., directions A, B, C, and D) may be considered "coarse" beam directions. In an aspect, a beam reference signal (BRS) may be transmitted in different transmit directions (e.g., directions A, B, C, and D).

In an aspect, the BS 404 may sweep the four different transmit directions (e.g., directions A, B, C, and D) in a cell-specific manner using four ports in a second symbol of a synchronization subframe. A synchronization beam may occur in a second symbol of the synchronization subframe.

Referring to diagram 420 of FIG. 4B, the UE 402 may listen for beamformed discovery signals in different receive directions (e.g., directions E, F, G, and H). In an example, the UE 402 may sweep through the receive directions according to a sequence E-F-G-H. In another example, the UE 402 may sweep through the receive directions according to the sequence F-H-E-J. Although only four receive directions and two receive sequences are described with respect to FIG. 4B, any number of different receive directions and receive sequences are contemplated.

The UE 402 may attempt the association by transmitting beamformed signals 426 (e.g., association signals or another indication of a best "coarse" beam or a best "fine" beam) in the different transmit directions (e.g., directions E, F, G, and H). In an aspect, the UE 402 may transmit an association signal 426 by transmitting along the optimal receive direction of the UE 402 at the time/resource where the BS 404 is expected to optimally receive the association signal. The BS 404 in the receive mode may sweep through different receive directions and detect the association signal 426 from the UE 402 during one or more timeslots corresponding to a receive direction. When a strong association signal 426 is detected, the BS 404 may determine an optimal transmit direction of the UE 402 and an optimal receive direction of the BS 404 corresponding to the strong association signal. For example, the BS 404 may determine preliminary antenna weights/directions of the strong association signal 426, and may further determine a time and/or resource where the UE 402 is expected to optimally receive a beamformed signal. Any of the processes discussed above with respect to FIGS. 4A and 4B may be refined or repeated over time such that the UE 402 and BS 404 eventually learn the most optimal transmit and receive directions for establishing a link with each other. Such refinement and repetition may be referred to as beam training.

In an aspect, the BS 404 may choose a sequence or pattern for transmitting the synchronization/discovery signals according to a number of beamforming directions. The BS 404 may then transmit the signals for an amount of time long enough for the UE 402 to sweep through a number of beamforming directions in an attempt to detect a synchronization/discovery signal. For example, a BS beamforming direction may be denoted by n, where n is an integer from 0 to N, N being a maximum number of transmit directions. Moreover, a UE beamforming direction may be denoted by k, where k is an integer from 0 to K, K being a maximum number of receive directions. When the UE 402 detects a synchronization/discovery signal from the BS 404, the UE 402 may discover that the strongest synchronization/discovery signal is received when the UE 402 beamforming direction is k=2 and the BS 404 beamforming direction is n=3. Accordingly, the UE 402 may use the same antenna weights/directions for responding (transmitting a beamformed signal) to the BS 404 in a corresponding response timeslot. That is, the UE 402 may send a signal to the BS 404 using UE 402 beamforming direction k=2 during a timeslot when the BS 404 is expected to perform a receive sweep at BS 404 beamforming direction n=3.

Path loss may be relatively high in millimeter wave (mmW) systems. Transmission may be directional to mitigate path loss. A BS may transmit one or more beam reference signals by sweeping in all directions so that a user equipment (UE) may identify a best "coarse" beam. Further, the BS may transmit a beam refinement request signal so that the UE may track "fine" beams. If a "coarse" beam identified by the UE changes, the UE may need to inform the BS so that the BS may train one or more new "fine" beams for the UE.

In various aspects, the UE may send an index of a best beam and corresponding beam refinement reference signal session request to the BS in a subframe reserved for RACH. The UE may occupy one or more tones reserved for RACH. Further, the UE may occupy tones that are reserved for scheduling request but not for RACH transmission.

FIGS. 5A through 5G are diagrams illustrating an example of the transmission of beamformed signals between a BS and a UE. The BS 504 may be embodied as a BS in a mmW system (mmW BS). It should be noted that while some beams are illustrates as adjacent to one another, such an arrangement may be different in different aspects (e.g., beams transmitted during a same symbol may not be adjacent to one another).

In an aspect, a beam set may contain eight different beams. For example, FIG. 5A illustrates eight beams 521, 522, 523, 524, 525, 526, 527, 528 for eight directions. In aspects, the BS 504 may be configured to beamform for transmission of at least one of the beams 521, 522, 523, 524, 525, 526, 527, 528 toward the UE 502. In one aspect, the BS 504 can sweep/transmit 112 directions using eight ports during the synchronization sub-frame.

In an aspect, a BS may transmit a beam reference signal (BRS) in a plurality of directions during a synchronization subframe. In one aspect, this transmission may be cell-specific. Referring to FIG. 5B, the BS 504 may transmit a first set of beams 521, 523, 525, 527 in four directions. For example, the BS 504 may transmit a BRS in a synchronization subframe of each of the transmit beams 521, 523, 525, 527. In an aspect, these beams 521, 523, 525, 527 transmitted in the four directions may be odd-indexed beams 521, 523, 525, 527 for the four directions out of a possible eight for the beam set. For example, the BS 504 may be capable of transmitting beams 521, 523, 525, 527 in directions adjacent to other beams 522, 524, 526, 528 that the BS 504 is configured to transmit. In an aspect, this configuration in which the BS 504 transmits beams 521, 523, 525, 527 for the four directions may be considered a "coarse" beam set.

In FIG. 5C, the UE 502 may determine or select a beam index that is strongest or preferable. For example, the UE 502 may determine that the beam 525 carrying a BRS is strongest or preferable. The UE 502 may select a beam based by measuring values for a received power or received quality associated with each of the first set of beams 521, 523, 525, 527, comparing respective values to one another, and selecting the beam that corresponds to the greatest value. The selected beam may correspond to a beam index at the BS 504. The UE 502 may transmit an indication 560 of this beam index to the BS 504. In an aspect, the indication 560 may include a request to transmit a beam refinement reference signal (BRRS). The BRRS may be UE-specific. One of ordinary skill would appreciate that the BRRS may be referred to by different terminology without departing from the present disclosure, such as a beam refinement signal, a beam tracking signal, or another term.

In various aspects, the UE 502 may determine a resource that corresponds to the selected beam index. A resource may include one of a radio frame, a subframe, a symbol, or a subcarrier region. Each resource may correspond to a value, for example, a radio frame index, a subframe index, a symbol index, or a subcarrier region. In one aspect, the UE 502 may have stored therein or may have access to a mapping or table (e.g., a lookup table) that indicates a respective resource (e.g., a value or index) to which the beam index corresponds. For example, the UE 502 may determine the beam index and then access a lookup table to determine a resource index or region that corresponds to the determined beam index.

In one aspect, the resource may be included in the PUCCH. In one aspect, the at least one resource may be included in subframe associated with a random access channel (RACH). For example, the resource may be included in a bandwidth reserved for RACH transmission. In another example, the at least one resource is included in a bandwidth that is unreserved for RACH transmission. According to another example, the bandwidth is reserved for scheduling request transmission.

The BS 504 may receive the indication 560, which may include a beam adjustment request (e.g., a request for beam tracking, a request for a BRRS, a request for the BS to start transmitting on an indicated beam ID without any further beam tracking, and the like). Based on the indication 560, the BS 504 may determine the index corresponding to the selected beam 525. That is, the indication 560 may be carried on a resource determined to correspond to the index of the selected beam 525. In one aspect, the BS 504 may have stored therein or may have access to a mapping or table (e.g., a lookup table) that indicates a respective resource (e.g., a value or index) to which the beam index corresponds. For example, the BS 504 may determine the resource on which the indication 560 is received and then access a lookup table to determine a beam index (e.g., the index corresponding to the selected beam 525) or region that corresponds to the determined beam index.

In FIG. 5D, the BS 504 may transmit a second set of beams based on the index included in the indication 560. For example, the UE 502 may indicate that a first beam 525 is strongest or preferable and, in response, the BS 504 may transmit a second set of beams 524, 525, 526 to the UE 502 based on the indicated beam index. In an aspect, the beams 524, 525, 526 transmitted based on the indicated beam index may be closer (e.g., spatially and/or directionally) to the selected beam 525 than those other beams 521, 523, 527 of the first set of beams. In an aspect, the beams 524, 525, 526 transmitted based on the indicated beam index may be considered a "fine" beam set. In an aspect, a BRRS may be transmitted in each of the beams 524, 525, 526 of the fine beam set. In an aspect, the beams 524, 525, 526 of the fine beam set may be adjacent.

Based on one or more BRRSs received in the beams 524, 525, 526 of the fine beam set, the UE 502 may transmit a second indication 565 to the BS 504 to indicate a best "fine" beam. In an aspect, the second indication 565 may use two (2) bits to indicate the selected beam. For example, the UE 502 may transmit an indication 565 that indicates an index corresponding to the selected beam 525. The BS 504 may then transmit to the UE 502 using the selected beam 525.

Referring to FIG. 5E, the BS 504 may transmit a BRS in a plurality of directions during a synchronization subframe. In an aspect, the BS 504 may transmit the BRS continuously, e.g., even after the UE 502 has communicated the indication 565 of a selected beam 525. For example, the BS 504 may transmit beams 521, 523, 525, 527 that each include a BRS (e.g., a "coarse" beam set).

Referring to FIG. 5F, the quality of the selected beam 525 may deteriorate so that the UE 502 may no longer prefer to communicate using the selected beam 525. Based on the BRS that is transmitted in synchronization subframes (e.g., continuously transmitted), the UE 502 may determine a new beam 523 on which to communicate. For example, the UE 502 may determine that the beam 523 carrying a BRS is strongest or preferable. The UE 502 may select a beam based by measuring values for a received power or received quality associated with each of the set of beams 521, 523, 525, 527, comparing respective values to one another, and selecting the beam that corresponds to the greatest value. The selected beam may correspond to a beam index at the BS 504. The UE 502 may transmit an request 570 indicating this beam index to the BS 504. In an aspect, the indication 560 may include a request to transmit a beam refinement reference signal (BRRS). The BRRS may be UE-specific.

In various aspects, the UE 502 may determine a resource that corresponds to the selected beam index. A resource may include one of a radio frame, a subframe, a symbol, or a subcarrier region. Each resource may correspond to a value, for example, a radio frame index, a subframe index, a symbol index, or a subcarrier region. In one aspect, a beam adjustment request (BAR) may be used to request the BS 504 to transmit a BRRS.

In one aspect, the UE 502 may have stored therein or may have access to a mapping or table (e.g., a lookup table) that indicates a respective resource (e.g., a value or index) to which the beam index corresponds. For example, the UE 502 may determine the beam index and then access a lookup table to determine a resource index or region that corresponds to the determined beam index.

In an aspect, the at least one resource may be included in a physical uplink control channel (PUCCH). However, the BS 504 may only be able to detect signals from the UE 502 in the first indicated beam 525 (FIG. 5C). Thus, the UE 502 may require a link budget on the PUCCH in order to indicate the request 570 using the PUCCH.

In another aspect, the at least one resource is included in a subframe associated with a RACH. In an aspect, the at least one resource is included in a bandwidth reserved for RACH transmission. In an aspect, the at least one resource may be included in a bandwidth that is unreserved for RACH transmission. In an aspect, the at least one resource may be included in a bandwidth that is reserved for scheduling request (SR) transmission, which may be in a RACH subframe but may be unreserved for RACH transmission.

With respect to FIG. 5G, the BS 504 may receive the request 570 from the UE 502. The BS 504 may be configured to determine a beam index of the set of beams (e.g., the set of beams illustrated in FIG. 5E) based on at least one of the request and/or the at least one resource. For example, the request 750 may be carried on a resource determined to correspond to the index of the selected beam 523. In one aspect, the BS 504 may have stored therein or may have access to a mapping or table (e.g., a lookup table) that indicates a respective resource (e.g., a value or index) to which the beam index corresponds. For example, the BS 504 may determine the resource on which the request 570 is received and then access a lookup table to determine a beam index (e.g., the index corresponding to the selected beam 523) or region that corresponds to the determined beam index. In an aspect, an uplink receive beam during reception of the request 570 may be based on the first set of beams 521, 523, 525, 527.

In an aspect, the BS 504 may be configured to transmit a second set of beams 522, 523, 524 based on at least one of the request 570 and/or the at least one resource on which the request 570 is carried. In an aspect, the BS 504 may be configured to determine, from the request 570 and/or the at least one resource carrying the request 570, a range of indexes. In an aspect, the BS 504 determines the beam index based on at least one subcarrier of the at least one resource on which the request 570 is carried.

In an aspect, the BS 504 determines, from within the range, the beam index based on a strength of a signal in different receive chains of the BS 504 through which the request 570 is received. For example, the BS 504 may receive the request 570 through a plurality of receive chains of the BS 504. The BS 504 may determine a signal strength of the request 570 for each receive chain through which the request 570 is received. The BS 504 may determine that each receive chain is associated with at least one beam index (e.g., the beam index for beam 523), and so the BS 504 may determine the beam index that corresponds to the receive chain in which the highest signal strength of the request 570 is detected.

In an aspect, the BS 504 may transmit, to the UE 502, an instruction to perform beam refinement based on the request 570. In an aspect, the instruction to perform beam refinement may be based on the selected beam 523 indicated to the BS 504 by the UE 502. In an aspect, the BS 504 may transmit one or more BRRSs in one or more synchronization subframes of the second set of beams 522, 523, 524. The UE 502 may measure the BRRS in the scheduled subframe(s) to determine the best beam of the BS 504, such as by measuring a respective value for a received power and/or received quality of each beam of the second set of beams 522, 523, 524, and comparing the measured values to one another to determine the highest values corresponding to a beam of the second set of beams 522, 523, 524.

Figure 6:
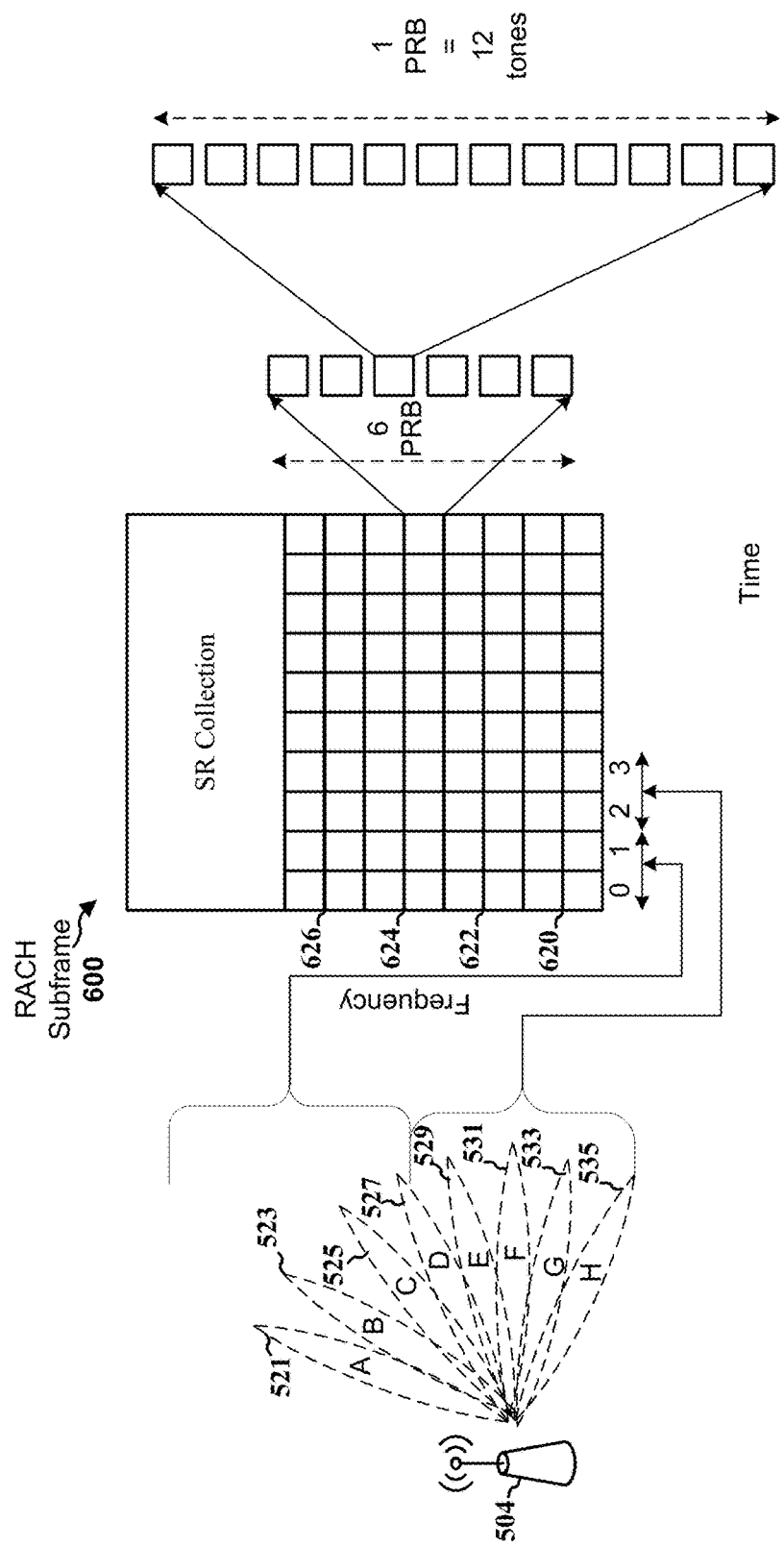
FIG. 6 is a diagram of a wireless communications system.

Referring to FIG. 6, a block diagram for indicating a selected beam is illustrated. In aspects, the BS 504 may transmit a set of beams A-H 521, 523, 525, 527, 529, 531, 533, 535. In aspects, the UE 502 may need to indicate a newly selected beam of the beams A-H 521, 523, 525, 527, 529, 531, 533, 535 to the BS 504, e.g., when a first selected beam deteriorates. However, because the BS 504 may only be able to detect transmission from the UE 502 in the direction of the first selected beam, the UE 502 may use a RACH subframe 600 in order to identify a new beam (e.g., because beamforming may not be required for RACH in a cell).

In one aspect, at least one of the BS 504 and/or the UE 502 maintains a mapping between beams (e.g., beams A-H 521, 523, 525, 527, 529, 531, 533, 535) associated with a synchronization (or BRS) session and RACH session. That is, the UE 502 may be configured to indicate a beam index using one or more resources of a RACH subframe 600, such as by transmitting a request (e.g., the request 570) on at least one resource corresponding to the beam index selected by the UE 502.

For example, the UE 502 may be configured to transmit the request 570 as a RACH sequence in a symbol 0 and 1 of the RACH subframe 600 if the selected beam index (e.g., the beam 523) corresponds to one of beams A-D 521, 523, 525, 527. Similarly, the UE 502 may be configured to transmit the request 570 as a RACH sequence in a symbol 2 and 3 of the RACH subframe 600 if the selected beam index corresponds to one of beams E-H 529, 531, 533, 535.

In one aspect, UE 502 may indicate a specific beam within the range using at least one subcarrier. For example, the UE 502 may indicate a beam within the range of beams A-D 521, 523, 525, 527 by using at least one of a pair of subcarriers 620, 622, 624, 626. Similarly, the UE 502 may indicate a beam within the range of beams E-H 529, 531, 533, 535 by using at least one of a pair of subcarriers 620, 622, 624, 626. For example, subcarriers 620 may indicate a first beam of a range and, therefore, when the UE 502 transmits a RACH sequence on symbols 0 and 1 and subcarriers 620, the UE 502 is indicating a selected beam A 521. By way of another example, the UE 502 may indicate a selected beam G 533 by transmitting a RACH sequence on subcarriers 624 (corresponding to a third beam within a range) on symbols 2 and 3. The BS 504 may therefore determine a selected beam index based on the at least one resource on which the RACH sequence is transmitted.

In another aspect, the BS 504 determines, from within the range, the beam index based on a strength of a signal in different receive chains of the BS 504 through which the request 570 is received. For example, the BS 504 may receive the request 570 through a plurality of receive chains of the BS 504. The BS 504 may determine a signal strength of the request 570 for each receive chain through which the request 570 is received. The BS 504 may determine that each receive chain is associated with at least one beam index (e.g., the beam index for beam 523), and so the BS 504 may determine the beam index that corresponds to the receive chain in which the highest signal strength of the request 570 is detected. For example, the UE 502 may select beam E 529 as the newly selected beam. To indicate the selected beam E 529, the UE 502 may transmit a RACH sequence on symbols 2 and 3 of the RACH subframe. The BS 504 may receive the RACH sequence through one or more receive chains of the BS 504. The BS 504 may determine signal strengths of the RACH sequence for each receive chain of the BS 504. The BS 504 may determine the selected beam E 529 because the highest signal strength of the RACH sequence may occur at the receive chain corresponding to a third beam of a range (and the range may be indicated by the symbols 2 and 3).

Indication of the selected beam index using a RACH subframe may experience various limitations. For example, the UE 502 may not be timing aligned with the BS 504 when transmitting a RACH sequence. A cyclic prefix in a RACH sequence may be greater than the summation of round trip time (RTT) and delay spread (e.g., in regular transmission, a cyclic prefix may need to be greater than a delay spread). Thus, the available number of cyclic shifts for UEs may be low. For example, the available number of cyclic shifts may be less than or equal to a sequence duration and/or cyclic prefix duration. Accordingly, the number of degrees of freedom in the RACH-reserved region of a RACH subframe 600 may be low. Further, there may be collision if many UEs transmit a beam adjustment request in the RACH subframe 600. Further, the RACH framework may include additional overhead (e.g., BS 504 sends a RACH response and allocates a separate grant to a UE to transmit additional information).

Accordingly, the UE 502 may transmit a beam adjustment request (e.g., a request for BRRS) in an unoccupied bandwidth of a RACH subframe. This region may be unreserved for RACH transmission. In an aspect, this region may be reserved for scheduling request (SR) transmission.

Figure 7:
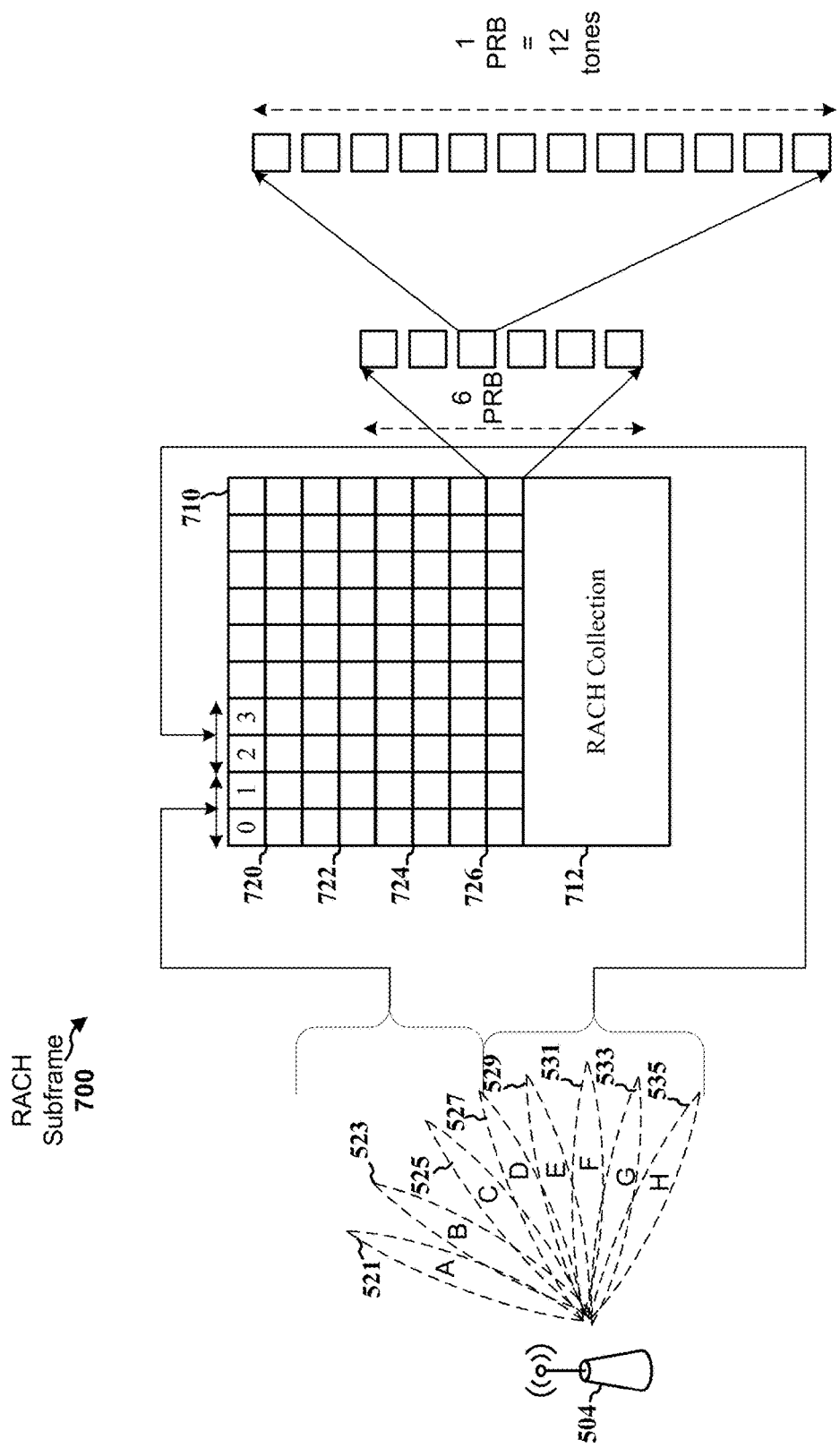
FIG. 7 is a diagram of a wireless communications system.

Referring to FIG. 7, a block diagram for indicating a selected beam is illustrated. In aspects, the BS 504 may transmit a set of beams A-H 521, 523, 525, 527, 529, 531, 533, 535. In aspects, the UE 502 may need to indicate a newly selected beam of the beams A-H 521, 523, 525, 527, 529, 531, 533, 535 to the BS 504, e.g., when a first selected beam deteriorates. However, because the BS 504 may only be able to detect transmission from the UE 502 in the direction of the first selected beam, the UE 502 may use a RACH subframe 700 in order to identify a new beam.

In aspects, the UE 502 may use a region 710 that may be unreserved for RACH transmission. In an aspect, this region 710 may be reserved for SR transmission (e.g., the region 710 may be used to collect buffer status report). In an aspect, a BAR procedure may be configured in the UE 502. For example, if a dedicated SR for BRRS request is configured to the UE 502, a PHY layer of the UE 502 may signal a dedicated SR for BRRS request in the SR region 710 of the RACH subframe 700.

In an aspect, the UE 502 may only transmit in the region 710 when the UE 502 is timing aligned with the BS 504. The number of available cyclic shifts associated with the region 710 may be higher than those available in the region 712 reserved for RACH transmission. Accordingly, there may be a higher degree of freedom associated with the region 710 compared to the region 712. For example, a plurality of UEs may be able to transmit requests (e.g., requests for beam tracking and/or BRRS) through the region 710 (e.g., more UEs than able to transmit requests through the RACH transmission region 712).

In an aspect, the UE 502 may select a transmission time for SR based on symbol index of the strongest beam (e.g., a beam in which a strongest BRS is received during a synchronization subframe). In an aspect, the UE 502 may transmit an SR during a RACH subframe 700 if instructed by a higher layer. For example, a PHY layer of the UE 502 may be provided with a plurality of parameters, including a band number $N_{SR}$, cyclic shift v, a root u, a parameter f, a system frame number (SFN), a BRS transmission period $N_{BRS}$, a number of symbols $N_{RACH}$ during the RACH subframe 700 for which the BS 504 may apply a different beams (e.g., different receive beams), a number of RACH subframes M in each radio frame, an index the current RACH subframe m, a symbol with the strongest synchronization beam $S_{Sync}^{BestBeam}$. The root u may be cell specific. The UE 502 may calculate a symbol index l based on the SFN, $N_{BRS}$, $N_{RACH}$, M, m, and $S_{Sync}^{BestBeam}$. For example, $$l = ((S_{Sync}^{BestBeam} - (SFN \cdot M \cdot N_{RACH} + m \cdot N_{RACH})\% \ N_{BRS})\% \ N_{BRS}) \cdot N_{rep},$$

Where $N_{rep}$ may denote the number of symbols dedicated to a single RACH transmission (e.g., $N_{rep}=2$).

In one aspect, at least one of the BS 504 and/or the UE 502 maintains a mapping between beams (e.g., beams A-H 521, 523, 525, 527, 529, 531, 533, 535) associated with a synchronization (or BRS) session and region 710. That is, the UE 502 may be configured to indicate a beam index using one or more resources of a RACH subframe 700, such as by transmitting a request (e.g., the request 570) on at least one resource corresponding to the beam index selected by the UE 502.

For example, the UE 502 may be configured to transmit the request 570 in a symbol 0 and 1 of the RACH subframe 700 if the selected beam index (e.g., the beam 523) corresponds to one of beams A-D 521, 523, 525, 527. Similarly, the UE 502 may be configured to transmit the request 570 in a symbol 2 and 3 of the RACH subframe 700 if the selected beam index corresponds to one of beams E-H 529, 531, 533, 535.

In one aspect, UE 502 may indicate a specific beam within the range using at least one subcarrier. For example, the UE 502 may indicate a beam within the range of beams A-D 521, 523, 525, 527 by using at least one of a pair of subcarriers 720, 722, 724, 726. Similarly, the UE 502 may indicate a beam within the range of beams E-H 529, 531, 533, 535 by using at least one of a pair of subcarriers 720, 722, 724, 726. For example, subcarriers 720 may indicate a first beam of a range and, therefore, when the UE 502 transmits a request on symbols 0 and 1 and subcarriers 720, the UE 502 is indicating a selected beam A 521. By way of another example, the UE 502 may indicate a selected beam G 533 by transmitting a request on subcarriers 724 (corresponding to a third beam within a range) on symbols 2 and 3. The BS 504 may therefore determine a selected beam index based on the at least one resource on which the request is transmitted.

In another aspect, the BS 504 determines, from within the range, the beam index based on a strength of a signal in different receive chains of the BS 504 through which the request 570 is received. For example, the BS 504 may receive the request 570 through a plurality of receive chains of the BS 504. The BS 504 may determine a signal strength of the request 570 for each receive chain through which the request 570 is received. The BS 504 may determine that each receive chain is associated with at least one beam index (e.g., the beam index for beam 523), and so the BS 504 may determine the beam index that corresponds to the receive chain in which the highest signal strength of the request 570 is detected. For example, the UE 502 may select beam E 529 as the newly selected beam. To indicate the selected beam E 529, the UE 502 may transmit a request on symbols 2 and 3 of the RACH subframe. The BS 504 may receive the request through one or more receive chains of the BS 504. The BS 504 may determine signal strengths of the request for each receive chain of the BS 504. The BS 504 may determine the selected beam E 529 because the highest signal strength of the request may occur at the receive chain corresponding to a third beam of a range (and the range may be indicated by the symbols 2 and 3).

Figure 8:
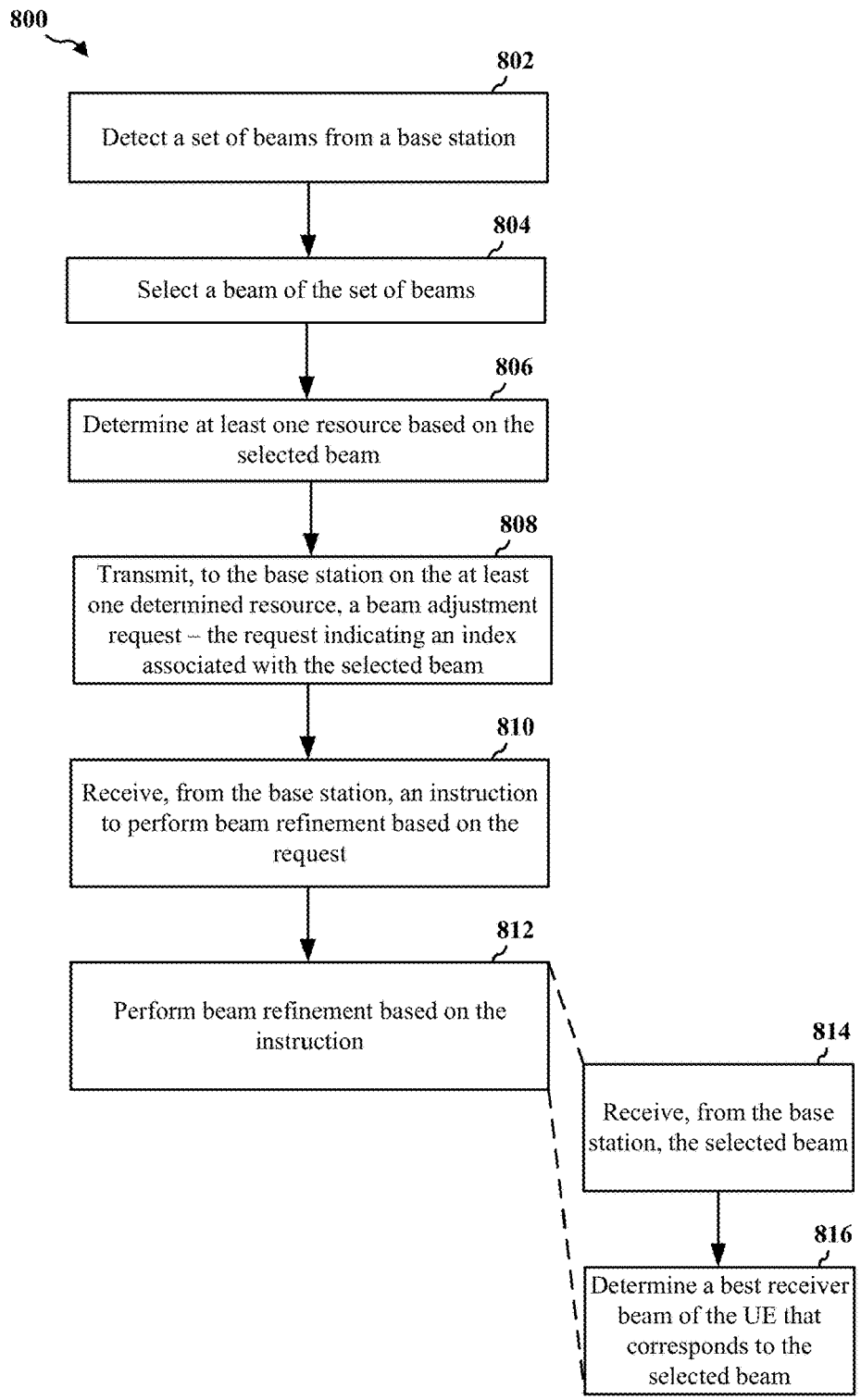
FIG. 8 is a flowchart of a method of wireless communication.

FIG. 8 is a flowchart 800 of a method of wireless communication. The method may be performed by a UE (e.g., the UE 502). One of ordinary skill would understand that one or more operations may be omitted, transposed, and or performed contemporaneously.

At operation 802, the UE may detect a set of beams from a BS, such as by detecting a BRS transmitted in a synchronization subframe of each beam of the first set of beams. In the context of FIG. 5E, the UE 502 may detect the first set of beams 521, 523, 525, 527, such as by detecting a BRS transmitted in a synchronization subframe of each beam 521, 523, 525, 527. The first set of beams may be odd-indexed beams.

At operation 804, the UE may select a beam of the set of beams. For example, the UE may determine that the beam carrying a BRS that is strongest or preferable. The UE may select a beam based by measuring values for a received power or received quality associated with each of the first set of beams, comparing respective values to one another, and selecting the beam that corresponds to the greatest value. The selected beam may correspond to a beam index at the BS. In the context of FIG. 5F, the UE 502 may select the beam 523.

At operation 806, the UE may determine at least one resource based on the selected beam. In the context of FIG. 5F, the UE 502 may determine at least one resource based on the selected beam 523. In the context of FIG. 6, the UE 502 may determine symbols 0 and 1 and/or subcarriers 622. In the context of FIG. 7, the UE 502 may determine symbols 0 and 1 and/or subcarriers 722 of the region 710.

In an aspect, the at least one resource indicates at least one of a radio frame index, a subframe index, a symbol index, or a subcarrier region. In an aspect, the at least one resource is included in a PUCCH. In an aspect, the at least one resource is included in a subframe associated with RACH. In one aspect, the at least one resource is included in a bandwidth associated with RACH. In an aspect, the at least one resource is included in a bandwidth that is unreserved for RACH transmission, such as a bandwidth reserved for SR transmission. In one aspect, the UE may have stored therein or may have access to a mapping or table (e.g., a lookup table) that indicates a respective resource (e.g., a value or index) to which the beam index corresponds. For example, the UE may determine the beam index and then access a lookup table to determine a resource index or region that corresponds to the determined beam index At operation 808, the UE may transmit, on the at least one determined resource, a beam adjustment request (e.g., a request for BRRS) to the BS. The request may indicate the index associated with the selected beam. In the context of FIG. 5F, the UE 502 may transmit the request 570.

At operation 810, the UE may receive an instruction to perform beam refinement (e.g., a BRRS) based on the request. In the context of FIG. 5G, the UE 502 may receive, from the BS 504, an instruction to perform beam refinement based on the request 570.

At operation 812, the UE may perform beam refinement based on the instruction. The UE may perform beam refinement based on the selected beam. In the context of FIG. 5G, the UE 502 may perform beam refinement based on an instruction from the BS 504.

In an aspect, operation 812 may include operations 814 and 816. At operation 814, the UE may receive, from the BS, the selected beam. In an aspect, the selected beam is included in a first set of beams from the BS. In the context of FIG. 5G, the UE 502 may receive the set of beams 522, 523, 524.

At operation 816, the UE may determine a best receiver beam of the UE that corresponds to the selected beam received from the BS. In the context of FIG. 5G, the UE 502 may receive a best receiver beam of the UE 502 for a beam within the set of beams 522, 523, 524—e.g., the UE 502 may determine a best receiver beam for beam 523.

Figure 9:
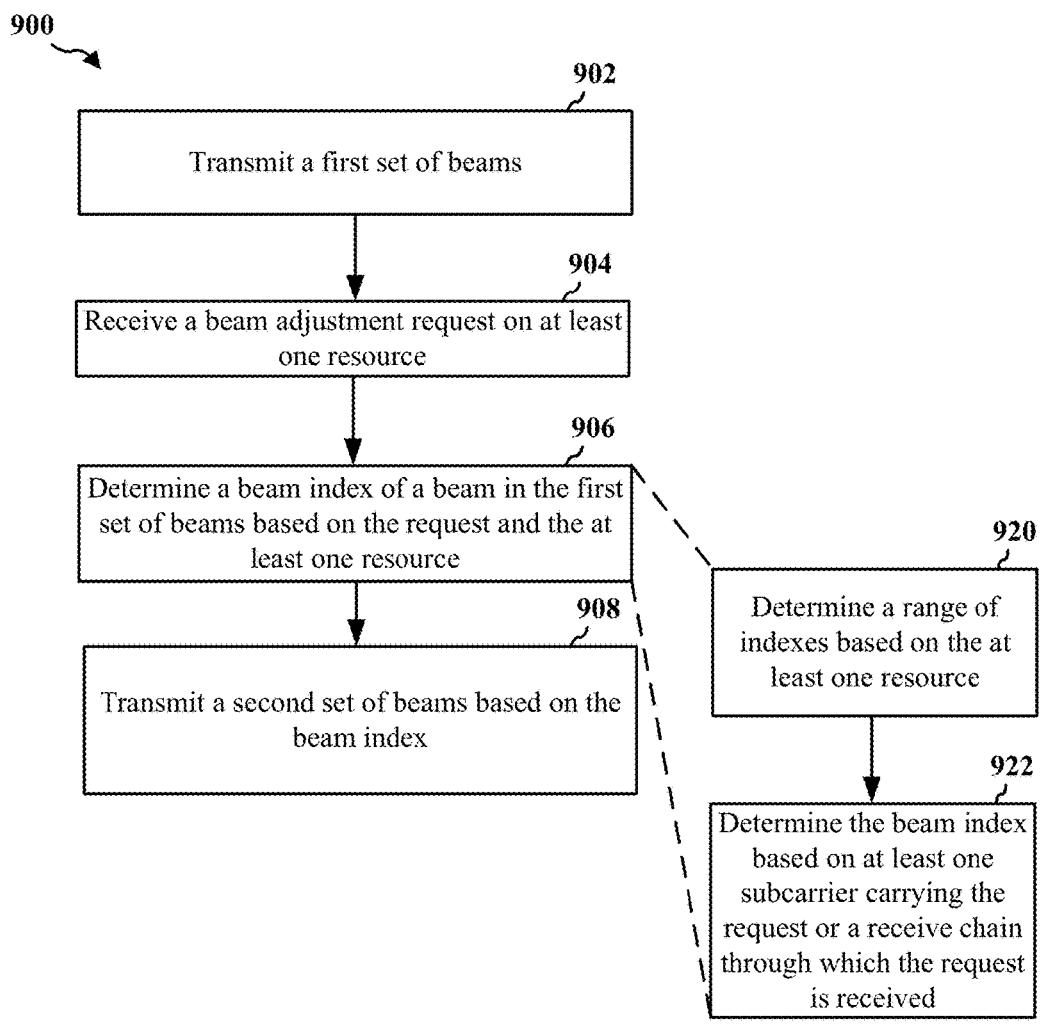
FIG. 9 is a flowchart of a method of wireless communication.

FIG. 9 is a flowchart 900 of a method of wireless communication. The method may be performed by a BS (e.g., the BS 504). One of ordinary skill would understand that one or more operations may be omitted, transposed, and or performed contemporaneously.

At operation 902, the BS may transmit a first set of beams, such as by transmitting a BRS a synchronization subframe of each beam of the first set of beams. The first set of beams may be odd-indexed beams. In the context of FIG. 5E, the BS 504 may transmit the first set of beams 521, 523, 525, 527.

At operation 904, the BS may receive a beam adjustment request on at least one resource. In the context of FIG. 5F, the BS 504 may receive the request 570 from the UE 502.

At operation 906, the BS may determine a beam index of a beam in the first set of beams based on the request and/or the at least one resource carrying the request. In one aspect, the BS may have stored therein or may have access to a mapping or table (e.g., a lookup table) that indicates a respective resource (e.g., a value or index) to which the beam index corresponds. For example, the BS may determine the resource on which the request is received and then access a lookup table to determine a beam index (e.g., the index corresponding to the selected beam) or region that corresponds to the determined beam index.

In the context of FIG. 5F, the BS 504 may determine at least one resource based on the request 570 and at least one resource carrying the request 570, for example, when the UE 502 indicates selected beam 523. In the context of FIG. 6, the BS 504 may detect the request 570 on symbols 0 and 1 and/or subcarriers 622, which may indicate the selected beam 523. In the context of FIG. 7, the BS 504 may detect the request 570 symbols 0 and 1 and/or subcarriers 722 of the region 710, which may indicate the selected beam 523.

In an aspect, the at least one resource is included in a PUCCH. In an aspect, the at least one resource is included in a subframe associated with RACH. In one aspect, the at least one resource is included in a bandwidth associated with RACH. In an aspect, the at least one resource is included in a bandwidth that is unreserved for RACH transmission, such as a bandwidth reserved for SR transmission.

In an aspect, operation 906 may include operations 920 and 922. At operation 920, the BS may determine a range of indexes based on the at least one resource. In the context of FIG. 5F, the BS 504 may determine a range of indexes based on the at least one resource carrying the request 570. In the context of FIG. 6, the BS 504 may determine symbols 0 and 1 to indicate a range of beam indexes. In the context of FIG. 7, the BS 504 may determine symbols 0 and 1 to indicate a range of beam indexes.

At operation 922, the BS may determine the beam index based on at least one subcarrier carrying the request or a receive chain of the BS through which the request is received. In the context of FIG. 6, the BS 504 may determine subcarriers 622 to indicate a beam index within the range of beam indexes. In the context of FIG. 7, the BS 504 may determine subcarriers 722 to indicate a beam index within the range of beam indexes. Alternatively, the BS 504 may determine a beam index based on a receive chain of the BS 504 through which the request is received.

At operation 908, the BS may transmit a second set of beams based on the beam index. The second set of beams may be "fine" beams. In the context of FIG. 5G, the BS 504 may transmit the second set of beams 522, 523, 524. In an aspect, the BS 504 may receive another beam index based on the second set of beams, such as two (2) bits from the UE 502.

Figure 10:
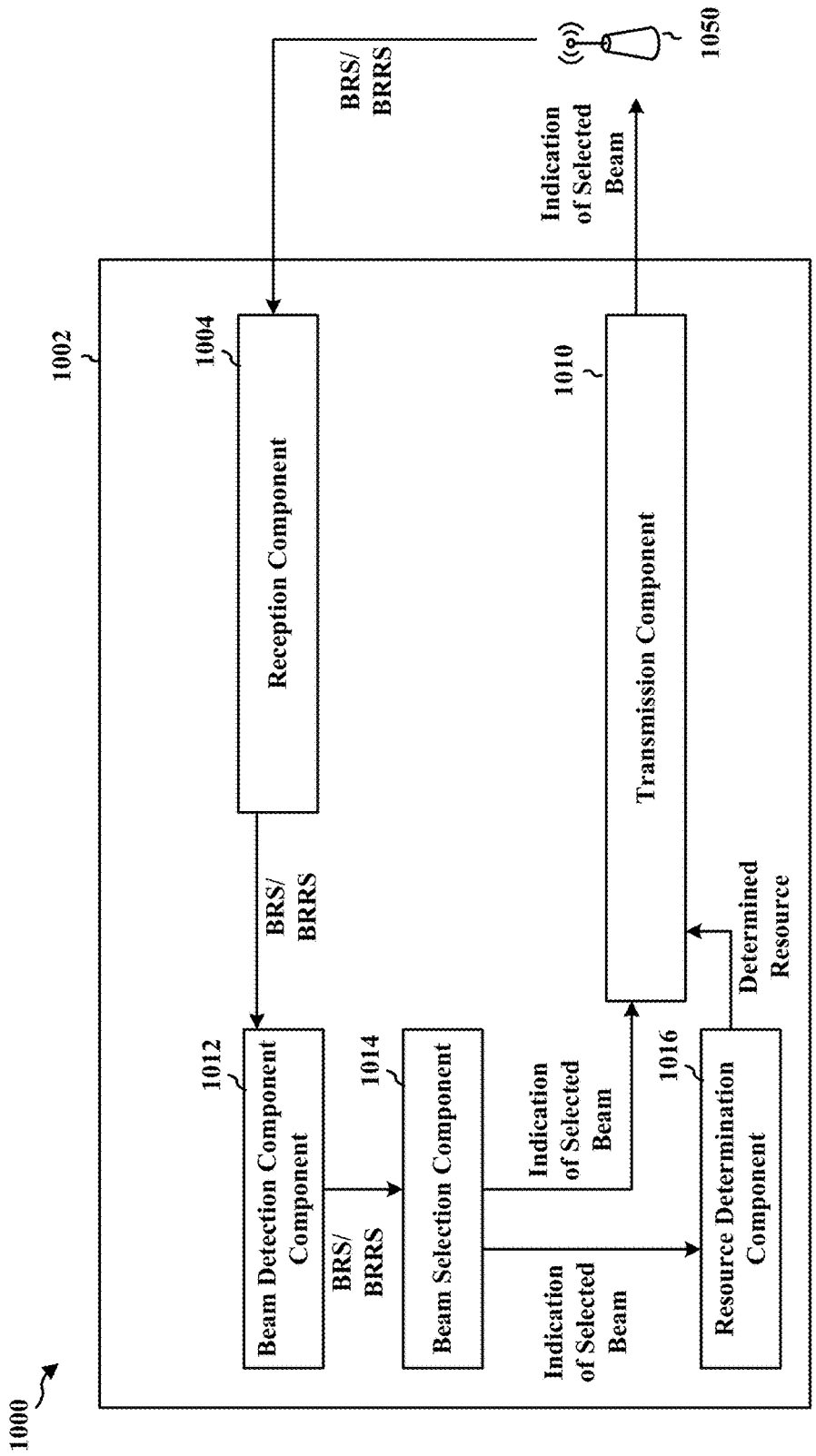
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE. The apparatus 1002 includes a reception component 1004 that may be configured to receive signals from a mmW BS (e.g., the BS 1050). The apparatus 1002 may include a transmission component 1010 configured to transmit signals to a mmW BS (e.g., the BS 1050).

The apparatus 1002 may include a beam detection component 1012 configured to detect one or more beams transmitted by a mmW BS 1050. In an aspect, the beam detection component 1012 may be configured to detect one or more BRSs transmitted on a "coarse" set of beams by the mmW BS 1050. The beam detection component 1012 may monitor one or more synchronization subframes and detect one or more BRSs transmitted by the mmW BS 504.

The beam selection component 1014 may be configured to select a beam based on the BRSs detected by the beam detection component 1012. For example, the beam selection component 1014 may be configured to measured received power or received quality of one or more BRSs and selected the beam corresponding to the highest received power or received quality. The beam selection component 1014 may provide an indication of this selected beam to a resource determination component 1016.

The selected beam may correspond to an index. The resource determination component 1016 may be configured to determine the resource that is to carry a beam adjustment request (e.g., a request for BRRS) in order to indicate the selected beam. For example, a resource may include one of a radio frame, a subframe, a symbol, or a subcarrier region. Each resource may correspond to a value, for example, a radio frame index, a subframe index, a symbol index, or a subcarrier region. In one aspect, the resource determination component 1016 may have stored therein or may have access to a mapping or table (e.g., a lookup table) that indicates a respective resource (e.g., a value or index) to which the beam index corresponds. For example, the resource determination component 1016 may determine the beam index and then access a lookup table to determine a resource index or region that corresponds to the determined beam index.

In one aspect, the resource is included in subframe associated with a RACH. In one aspect, the resource is included in a bandwidth reserved for RACH transmission. In one aspect, the resource is included in a bandwidth that is unreserved for RACH transmission. In one aspect, the bandwidth is reserved for scheduling request transmission. In one aspect, the resource is included in a PUCCH.

The resource determination component 1016 may provide an indication of the determined resource to a transmission component 1010. The transmission component 1010 may be configured to transmit a beam adjustment request to the mmW BS 1050 on the determined resource in order to indicate an index associated with the selected beam. The beam adjustment request may include a request for a BRRS.

In one aspect, the beam detection component 1012 may receive, from the mmW BS 1050, an instruction to perform beam refinement at a receiver (e.g., the reception component 1004) of the apparatus 1002. The beam detection component 1012 may perform beam refinement based on the request.

The apparatus may include additional components that perform each of the blocks of the algorithm in the aforementioned flowcharts of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
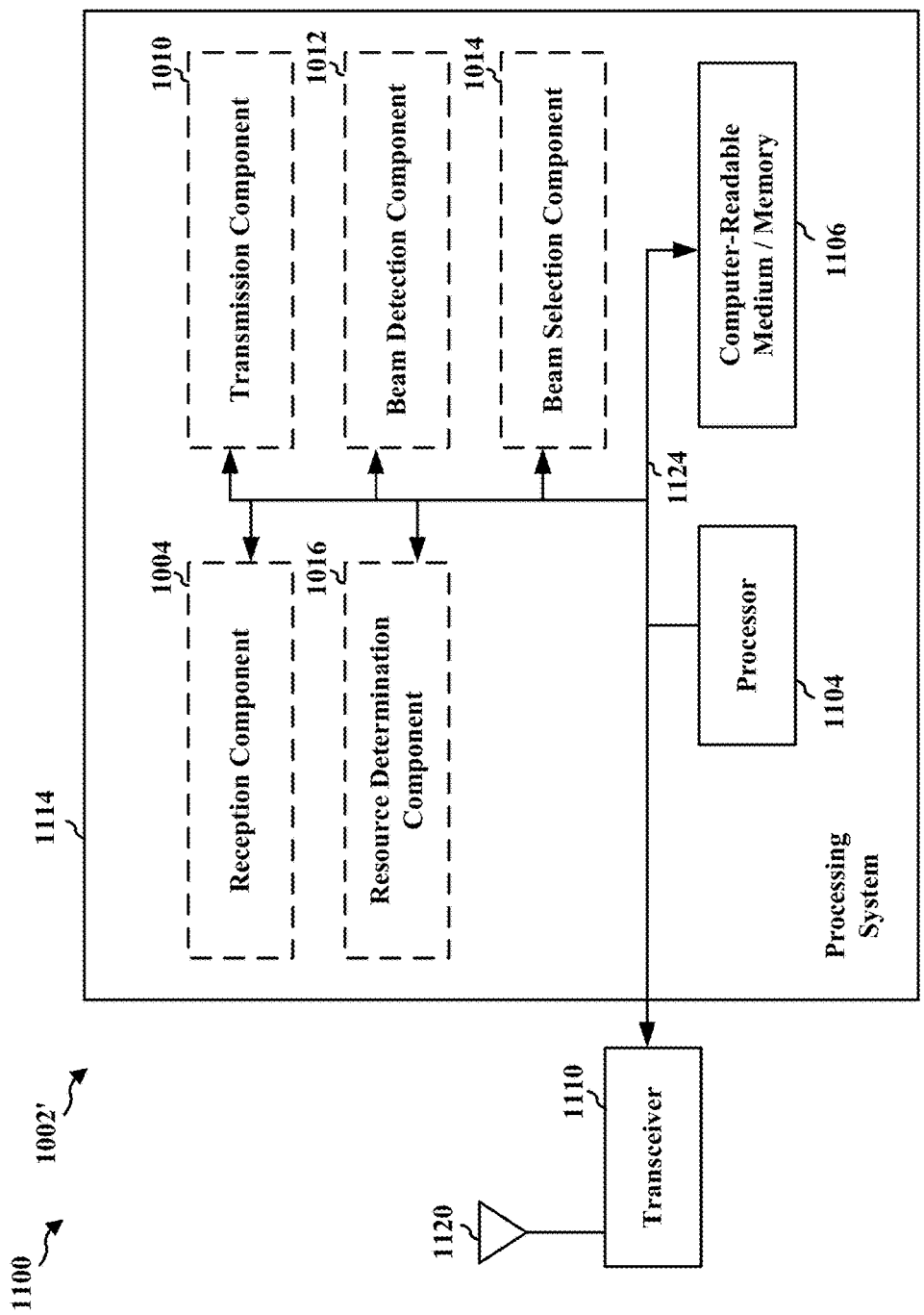
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1010, 1012, 1014, 1016, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1010, 1012, 1014, 1016. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for detecting a set of beams from a base station. The apparatus 1002/1002' may further include means for selecting a beam of the set of beams. The apparatus 1002/1002' may further include determining at least one resource based on the selected beam. In an aspect, the at least one resource may include at least one of a radio frame index, a subframe index, a symbol index, or a subcarrier region. The apparatus 1002/1002' may further include means for transmitting, on the at least one determined resource, a beam adjustment request to the base station, wherein the at least one determined resource indicates an index associated with the selected beam.

In an aspect, the beam adjustment request to the base station comprises a request for a BRRS. In an aspect, the at least one resource is included in subframe associated with a RACH. In an aspect, the at least one resource is included in a bandwidth reserved for RACH transmission. In an aspect, the at least one resource is included in a bandwidth that is unreserved for RACH transmission. In an aspect, the bandwidth is reserved for scheduling request transmission. In an aspect, the at least one resource is included in a PUCCH.

In an aspect, the apparatus 1002/1002' may further include means for receiving, from the base station, an instruction to perform beam refinement at a receiver of the UE based on the request. The apparatus 1002/1002' may further include apparatus 1002/1002' performing beam refinement based on the request. In an aspect, the performance of beam refinement at the UE receiver is further based on the selected beam.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
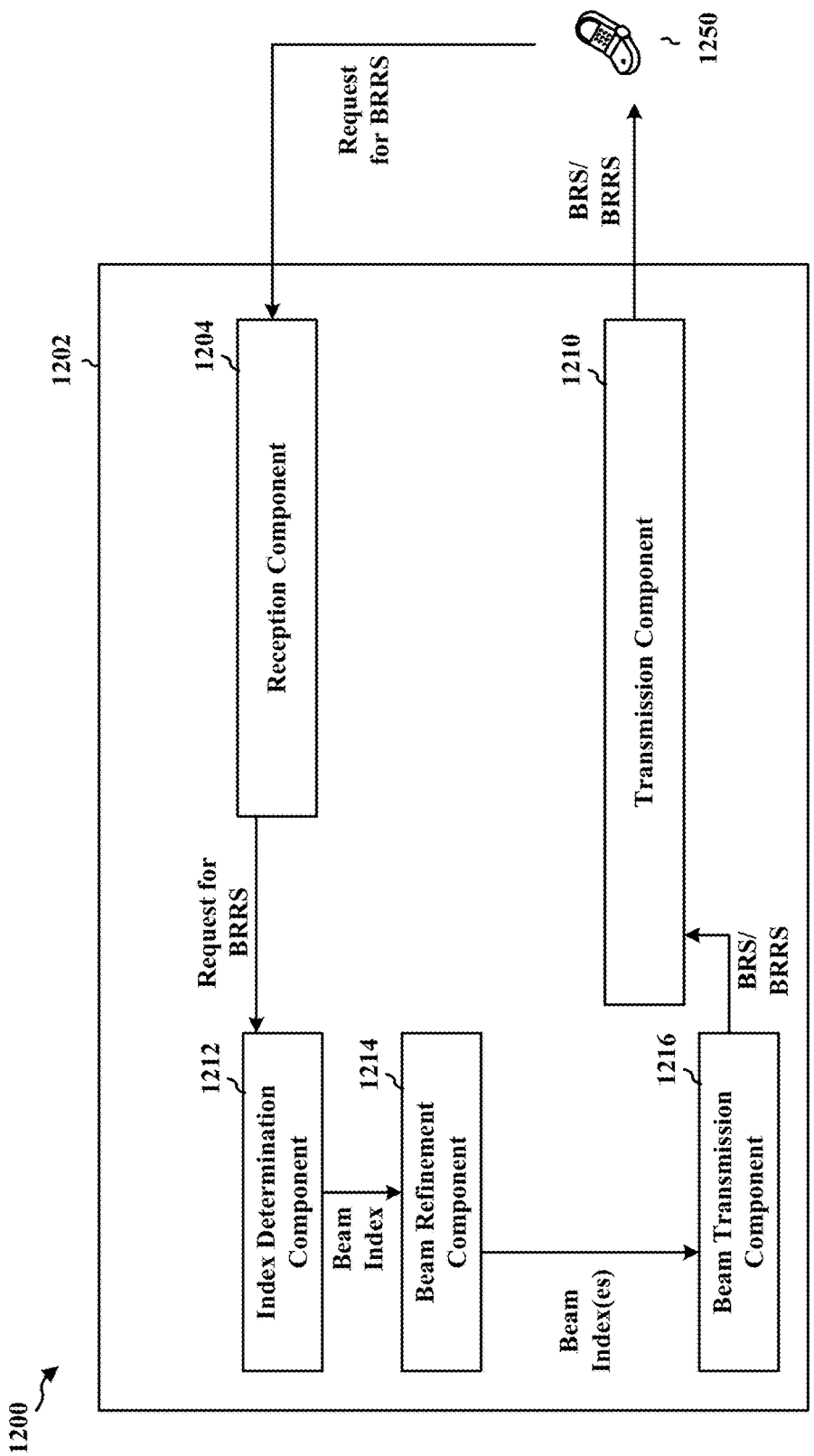
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a base station (e.g., a mmW base station). The apparatus 1202 includes a reception component 1204 that may receive signals from a UE (e.g., the UE 1250). The apparatus 1202 may include a transmission component 1210 that may transmit signals to a UE (e.g., the UE 1250).

In an aspect, the beam transmission component 1216 may be configured to transmit a first of beams to the UE 1250. For example, the beam transmission component 1216 may be configured to transmit a respective BRS in a respective synchronization subframe of a respective beam. The first set of beams may be a "coarse" set of beams.

The UE 1250 may receive the first set of beams and select a best or preferred beam. The UE 1250 may then transmit a beam adjustment request (e.g., a BRRS request. The reception component 1204 may receive this request, which is carried on at least one resource, and provide the same to an index determination component 1212.

The index determination component 1212 may be configured to determine a beam index of a beam in the first set of beams based on the at least one resource that carries the request. The index determination component 1212 may be configured to determine the resource carries the beam adjustment request in order to determine a beam selected by the UE 1250. For example, a resource may include one of a radio frame, a subframe, a symbol, or a subcarrier region. Each resource may correspond to a value, for example, a radio frame index, a subframe index, a symbol index, or a subcarrier region. In one aspect, the index determination component 1212 may have stored therein or may have access to a mapping or table (e.g., a lookup table) that indicates a respective resource (e.g., a value or index) to which the beam index corresponds. For example, the index determination component 1212 may determine the beam index and then access a lookup table to determine a resource index or region that corresponds to the beam index.

In one aspect, the resource is included in subframe associated with a RACH. In one aspect, the resource is included in a bandwidth reserved for RACH transmission. In one aspect, the resource is included in a bandwidth that is unreserved for RACH transmission. In one aspect, the bandwidth is reserved for scheduling request transmission. In one aspect, the resource is included in a PUCCH.

In an aspect, the index determination component 1212 determines, from within a range, the beam index based on a strength of a signal in different receive chains of the apparatus 1204 (e.g., the receive chains included in the receive chains of the reception component 1204) through which the request is received. For example, the reception component 1204 may receive the request through a plurality of receive chains. The index determination component 1212 may determine a signal strength of the request for each receive chain through which the request is received. The index determination component 1212 may determine that each receive chain is associated with at least one beam index, and so the index determination component 1212 may determine the beam index that corresponds to the receive chain in which the highest signal strength of the request is detected.

The index determination component 1212 may provide an indication of the beam index selected by the UE 1250 to a beam refinement component 1214. The beam refinement component 1214 may determine a second set of beams to transmit to the UE 1250. The second set of beams may be a "fine" beam set, which may be directionally and/or spatially closer to the beam selected by the UE 1250, the index of which may be determined by the index determination component 1212. The beam refinement component 1214 may provide an indication of the indexes of the second set of beams to the beam transmission component 1216.

The beam transmission component 1216 may be configured to transmit the second of beams to the UE 1250. For example, the beam transmission component 1216 may be configured to transmit a respective BRRS in a respective synchronization subframe of a respective beam. The second set of beams may be a "fine" set of beams.

In an aspect, the beam transmission component 1216 may transmit, to the UE 1250, an instruction to perform beam refinement based on the request. In an aspect, the instruction to perform beam refinement may be based on the selected beam determined by the index determination component 1212. The beam transmission component 1216 may perform beam tracking with the UE 1250.

The apparatus may include additional components that perform each of the blocks of the algorithm in the aforementioned flowcharts of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
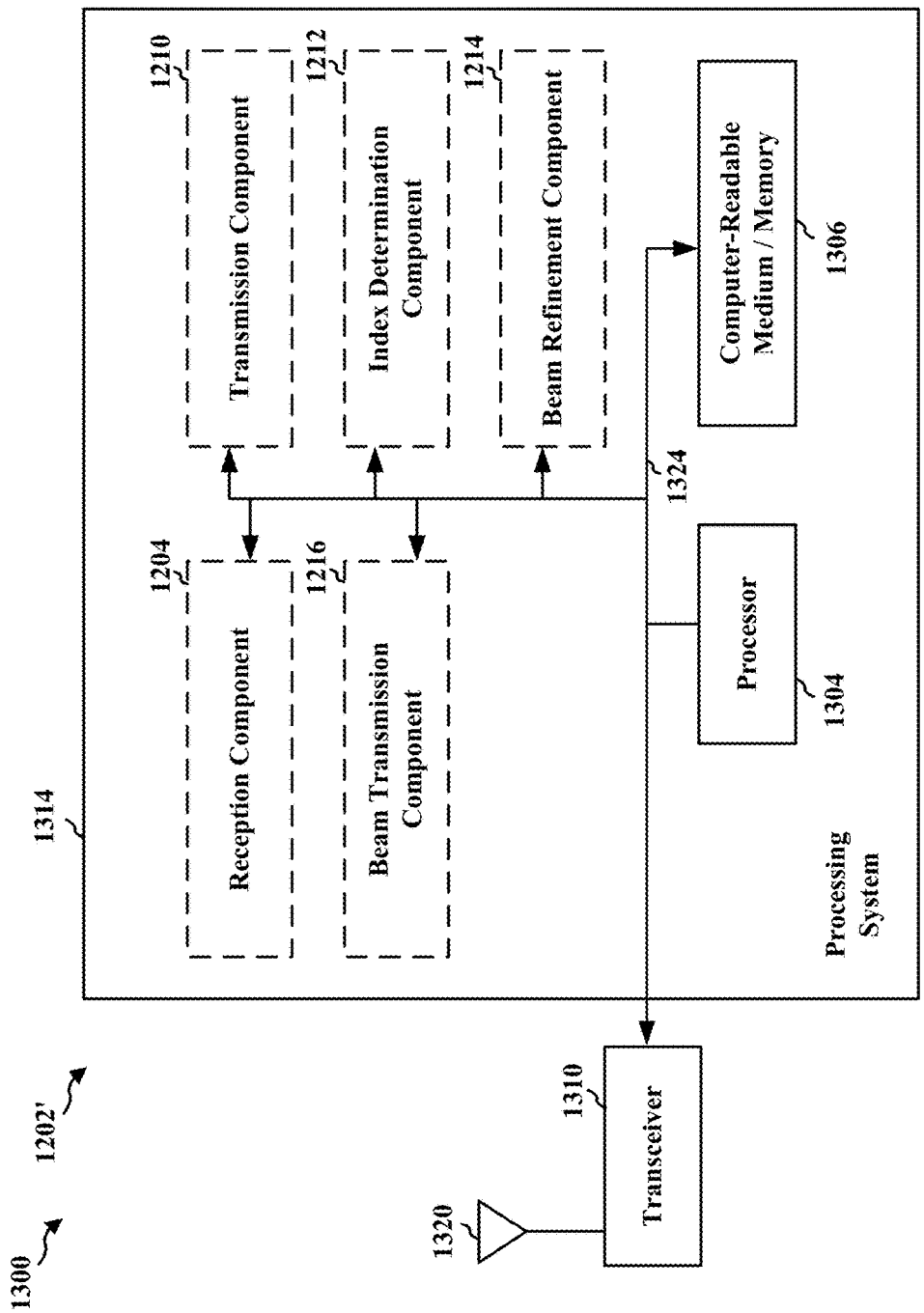
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1210, 1212, 1214, 1216, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1210, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1210, 1212, 1214, 1216. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375.

In one configuration, the apparatus 1202/1202' for wireless communication includes means for transmitting a first set of beams. The apparatus 1202/1202' may further include means for receiving a beam adjustment request on at least one resource. In an aspect, the at least one resource may include at least one of a radio frame index, a subframe index, a symbol index, or a subcarrier region. The apparatus 1202/1202' may further include means for determining a beam index of a beam in the first set of beams based on the at least one resource.

In an aspect, the beam adjustment request comprises a request to transmit a BRRS. In an aspect, the apparatus 1202/1202' may further include means for transmitting an instruction to perform beam tracking based on the request and determined beam index. In an aspect, the apparatus 1202/1202' may further include means for performing beam tracking with the UE. In an aspect, the apparatus 1202/1202' may further include means for transmitting a second set of beams based on the determined beam index to perform the beam tracking.

In an aspect, the at least one resource is included on a PUCCH. In an aspect, the at least one resource is included on subframe associated with a RACH. In an aspect, the at least one resource is included in a bandwidth associated with RACH transmission. In an aspect, the at least one resource is included in a bandwidth that is unreserved for RACH transmission. In an aspect, the bandwidth is reserved for scheduling request transmission. In an aspect, the at least one resource indicates a range of indexes and a subcarrier of the at least one resource indicates the beam index within the range.

In an aspect, a subframe of the at least one resource indicates a range of indexes, and the apparatus 1202/1202' further includes means for determining, from within the range, the beam index based on a strength of a signal in different receive chains of the base station through which the request is received.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a user equipment (UE), the method comprising:
   determining that a beam from a base station has deteriorated;
   detecting a set of beams from the base station;
   selecting a beam of the set of beams;
   determining at least one resource based on the selected beam, the at least one resource including at least one of a radio frame index, a subframe index, a symbol index, or a subcarrier region; and
   transmitting, to the base station on the at least one determined resource and based on the determining that the beam from the base station has deteriorated, a beam adjustment request, wherein the at least one determined resource indicates an index associated with the selected beam.

2. The method of claim 1, wherein the beam adjustment request to the base station comprises a request for a beam refinement reference signal (BRRS).

3. The method of claim 1, wherein the at least one resource is included in subframe associated with a random access channel (RACH).

4. The method of claim 3, wherein the at least one resource is included in a bandwidth reserved for RACH transmission.

5. The method of claim 3, wherein the at least one resource is included in a bandwidth that is unreserved for RACH transmission.

6. The method of claim 5, wherein the bandwidth is reserved for scheduling request transmission.

7. The method of claim 1, wherein the at least one resource is included in a physical uplink control channel (PUCCH).

8. The method of claim 1, further comprising:
   receiving, from the base station, an instruction to perform beam refinement at a receiver of the UE based on the request; and
   performing beam refinement based on the instruction.

9. The method of claim 8, wherein the performance of beam refinement at the UE receiver is further based on the selected beam.

10. A user equipment (UE), the UE comprising:
    means for determining that a beam from a base station has deteriorated;
    means for detecting a set of beams from the base station;
    means for selecting a beam of the set of beams;
    means for determining at least one resource based on the selected beam, the at least one resource including at least one of a radio frame index, a subframe index, a symbol index, or a subcarrier region; and
    means for transmitting, to the base station on the at least one determined resource and based on the determining that the beam from the base station has deteriorated, a beam adjustment request, wherein the at least one determined resource indicates an index associated with the selected beam.

11. The UE of claim 10, wherein the beam adjustment request comprises a request for a beam refinement reference signal (BRRS).

12. The UE of claim 10, wherein the at least one resource is included in subframe associated with a random access channel (RACH).

13. The UE of claim 10, wherein the at least one resource is included in a physical uplink control channel (PUCCH).

14. The UE of claim 10, further comprising:
    means for receiving, from the base station, an instruction to perform beam refinement at a receiver of the UE based on the beam adjustment request; and
    means for performing beam refinement based on the instruction.

15. An apparatus for wireless communication, the apparatus comprising:
    a memory; and
    at least one processor coupled to the memory and configured to:
       determine that a beam from a base station has deteriorated;
       detect a set of beams from the base station;
       select a beam of the set of beams;
       determine at least one resource based on the selected beam, the at least one resource including at least one of a radio frame index, a subframe index, a symbol index, or a subcarrier region; and
       transmit, to the base station on the at least one determined resource and based on the determination that the beam from the base station has deteriorated, a beam adjustment request, wherein the at least one determined resource indicates an index associated with the selected beam.

16. The apparatus of claim 15, wherein the beam adjustment request to the base station comprises a request for a beam refinement reference signal (BRRS).

17. The apparatus of claim 15, wherein the at least one resource is included in subframe associated with a random access channel (RACH).

18. The apparatus of claim 17, wherein the at least one resource is included in a bandwidth reserved for RACH transmission.

19. The apparatus of claim 17, wherein the at least one resource is included in a bandwidth that is unreserved for RACH transmission.

20. The apparatus of claim 19, wherein the bandwidth is reserved for scheduling request transmission.

21. The apparatus of claim 15, wherein the at least one resource is included in a physical uplink control channel (PUCCH).

22. The apparatus of claim 15, wherein the at least one processor is further configured to:
    receive, from the base station, an instruction to perform beam refinement at a receiver of the apparatus based on the request; and
    perform beam refinement based on the instruction.

23. The apparatus of claim 22, wherein the performance of beam refinement at the apparatus receiver is further based on the selected beam.

24. A non-transitory, computer-readable medium storing computer-executable code for wireless communication by a user equipment (UE), comprising code to:
    determine that a beam from a base station has deteriorated;
    detect a set of beams from the base station;
    select a beam of the set of beams;
    determine at least one resource based on the selected beam, the at least one resource including at least one of a radio frame index, a subframe index, a symbol index, or a subcarrier region; and transmit, to the base station on the at least one determined resource and based on the determination that the beam from the base station has deteriorated, a beam adjustment request, wherein the at least one determined resource indicates an index associated with the selected beam.

\* \* \* \* \*